(12) United States Patent
Matsumoto et al.

(10) Patent No.: US 7,512,054 B2
(45) Date of Patent: Mar. 31, 2009

(54) METHOD FOR OPTICAL RECORDING, METHOD FOR OPTICAL REPRODUCING, OPTICAL RECORDING MEDIUM, AND OPTICAL RECORDING AND REPRODUCING APPARATUS UTILIZING HOLOGRAPHY

(75) Inventors: Kazuki Matsumoto, Kawasaki (JP); Yuuji Kubota, Yokohama (JP); Naru Ikeda, Yokohama (JP); Akiko Hirao, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 734 days.

(21) Appl. No.: 11/231,251

(22) Filed: Sep. 21, 2005

(65) Prior Publication Data

US 2006/0171284 A1 Aug. 3, 2006

(30) Foreign Application Priority Data

Feb. 2, 2005 (JP) ............................. 2005-026605

(51) Int. Cl.
*G11B 7/00* (2006.01)
(52) U.S. Cl. ..................................... 369/103; 369/275.1
(58) Field of Classification Search ........................ None
See application file for complete search history.

(56) References Cited

U.S. PATENT DOCUMENTS

2004/0042374 A1 3/2004 Horimai et al.

FOREIGN PATENT DOCUMENTS

JP 2002-123949 4/2002

OTHER PUBLICATIONS

Horimai et al.; "A Novel Collinear Optical Setup for Holographic Data Storage System"; Int. Soc. Opt. Eng., Proceedings of SPIE, vol. 5380, pp. 297-303, (2004).
Horimai et al.; "A Novel Collinear Optical Setup for Holographic Data Storage System"; Technical digest of Optical Data Storage Topical Meeting 2004, pp. 258-260, (2004).
U.S. Appl. No. 11/337,675, filed Jan. 24, 2006, to Hirao et al.

*Primary Examiner*—Wayne R Young
*Assistant Examiner*—Adam R Giesy
(74) *Attorney, Agent, or Firm*—Finnegan, Henderson, Farabow, Garrett & Dunner, L.L.P.

(57) ABSTRACT

The present invention relates to a method for optical recording in which information is recorded on an optical recording media utilizing holography and to a method for optical reproducing in which information recorded on an optical recording media utilizing holography is reconstructed. The methods includes preparing an optical recording media having wavelength reference marks with a periodic structure which are associated with a recording base wavelength, irradiating the wavelength reference marks with a beam from a light source on recording information or on reproducing information to detect a wavelength shift of the light source with respect to the base wavelength based on a diffraction beam from the wavelength reference marks, and performing recording or reproducing while controlling the wavelength of the light source so as to reduce the wavelength shift.

14 Claims, 10 Drawing Sheets

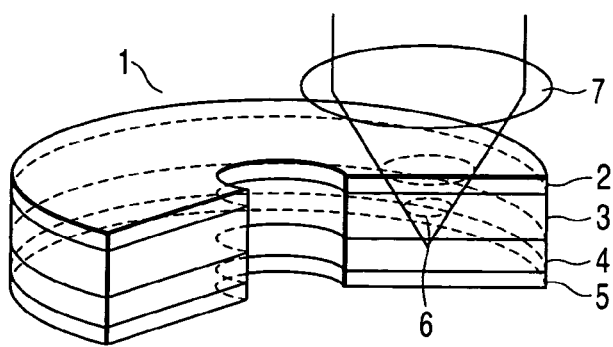
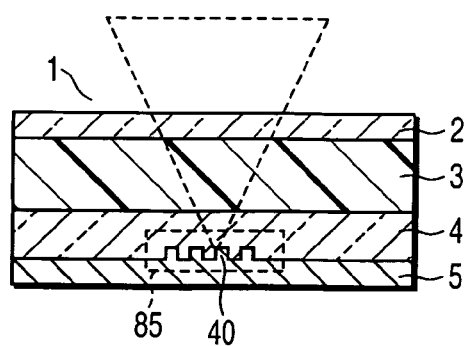
FIG. 1      FIG. 2
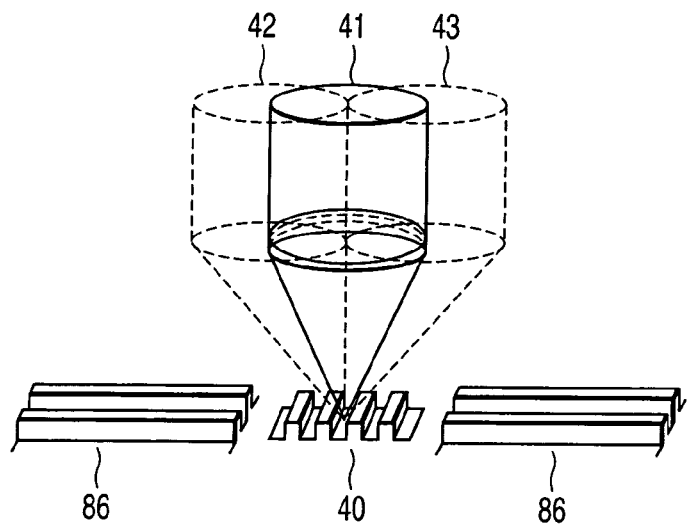
FIG. 3
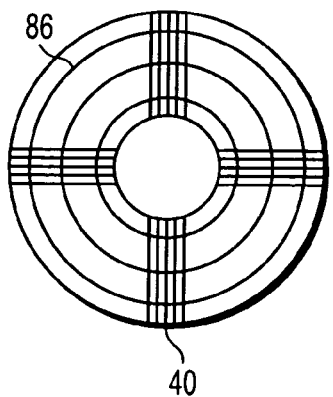 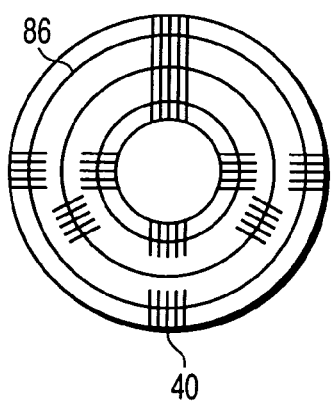
FIG. 4A      FIG. 4B Short wavelength Base wavelength Long wavelength

METHOD FOR OPTICAL RECORDING, METHOD FOR OPTICAL REPRODUCING, OPTICAL RECORDING MEDIUM, AND OPTICAL RECORDING AND REPRODUCING APPARATUS UTILIZING HOLOGRAPHY

CROSS-REFERENCE TO RELATED APPLICATIONS

This application is based upon and claims the benefit of priority from prior Japanese Patent Application No. 2005-026605, filed Feb. 2, 2005, the entire contents of which are incorporated herein by reference.

BACKGROUND OF THE INVENTION

1. Field of the Invention

The present invention relates to a method for optical recording, a method for optical reproducing, an optical recording media, and an optical recording and reproducing apparatus which utilize holography, particularly digital volume holography.

2. Description of the Related Art

Optical recording media have been developed as data storage media that can record data such as high-density images with a large volume. The following optical recording media have hitherto been put to practical use: magneto-optic recording media, phase-change optical recording media, and CD-R. However, there is a growing demand for the increased volume of optical recording media. Hologram type optical recording media has been proposed which uses holography, particularly digital volume holography in order to realize large-capacity optical recording.

A method for optical recording and reproducing using holography is generally performed as described below. For recording, an information beam to which information is imparted in the form of a two-dimensional pattern is interfered with a reference beam inside an optical recording media. Information is thus recorded as interference patterns. For reproducing, recorded interference patterns are irradiated only with the reference beam. Recorded information is thus read out in the form of a two-dimensional pattern as a diffraction image from the interference patterns. Thus, this system has an advantage of making it possible to input and output information at high speed. In particular, the method for optical recording and reproducing using digital volume holography has an advantage of improving diffraction efficiency by utilizing the thickness direction of the optical recording media to three-dimensionally record the interference patterns, making it possible to record information in a specific region in the optical recording media in a multiplexed manner, and thus increasing storage capacity.

If placement (for example, the angle or position of irradiation) of the reference beam applied to the interference patterns already recorded on the optical recording media as described above is slightly shifted from its original placement for recording, the phases of the reference beam and interference patterns cannot be matched even though the recorded interference patterns are irradiated with the reference beam, thus precluding a diffraction image from being obtained. By recording interference patterns with the reference beam having the placement with which the diffraction image cannot be obtained and another information beam, it is possible to record plural pages of two-dimensional information in the same region inside the optical recording media in a multiplexed manner according to the placement of the reference beam. In this manner, the optical recording and reproducing using holography utilizes the matching between the interference patterns and the phase of light to enable multiplex recording of information. However, this implies that a diffraction beam is not obtained even if the wavelength for recording differs from that for reproducing, in other words, this method is not resistant to a wavelength variation between a recording beam and reproducing beam.

As well known, when a hologram is recorded, the use of a spatially modulated reference beam complicates recorded interference patterns, thus requiring strict phase matching conditions for the reference beam and interference patterns. Thus, the degree of recording multiplexing can be increased. For example, an optical recording and reproducing apparatus is presented which employs holography using a reference beam for recording the phase of which is spatially modulated (see Jpn. Pat. Appln. KOKAI Publication No. 2002-123949). A method has recently been disclosed which uses one spatial light modulator to generate an information beam and a modulated reference beam to record a hologram (see Hideyuki Hiromi and Kun Li, "A novel Collinear optical Setup for Holographic data Storage System", Technical Digest of Optical Data Storage Topical Meeting 2004, pp 258-260, (2004)). However, this method requires more precise phase matching conditions for the reference beam and interference patterns. Consequently, a wavelength variation between the recording beam and reproducing beam more greatly affects recording and reproducing performance. Disadvantageously, this poses significant problems of portability of the optical recording media and compatibility between apparatuses.

A laser is commonly used to record and reconstruct a hologram. As the laser, a gas laser such as an argon laser or a helium neon laser or a solid-state laser such as a YAG laser has often been used in view of monochromaticity and coherence. However, it is preferable to use a semiconductor laser in order to provide a small-sized optical recording and reproducing apparatus with low power consumption. The semiconductor laser has already been incorporated into an optical recording and reproducing apparatus for optical recording media such as CD and DVD. The semiconductor laser enables emission of a laser beam with a sufficiently high luminance in a practical sense. However, a small variation in the composition of a material or the size or structure of elements causes problems that the semiconductor laser may oscillate at a plurality of wavelengths ant that an oscillation wavelength may vary with semiconductor lasers by several nm to about 10 nm. It is also known that the oscillation wavelength of one semiconductor laser may vary depending on temperature or the value of injection current. Therefore, it is inappropriate to use a semiconductor laser to record and reconstruct a hologram that is not resistant to the wavelength vibration. Further, to allow the same laser wavelength to be used for both recording and reproducing regardless of different environments or apparatuses, it is conceivable to incorporate a wavelength selecting structure called a DFB (Distributed FeedBack) or DBR (Distributed Bragg Reflector) into a semiconductor laser element itself and to precisely control laser manufacturing conditions so as to provide uniform characteristics. However, this method results in a low yield and high manufacturing costs. Therefore, this method is not practical.

BRIEF SUMMARY OF THE INVENTION

According to an aspect of the present invention, there is provided a method for optical recording in which information is recorded on an optical recording media utilizing holography, the method comprising: preparing an optical recording media having wavelength reference marks with a periodic structure which are associated with a recording base wavelength; irradiating the wavelength reference marks with a beam from a light source on recording information to detect a wavelength shift of the light source with respect to the base wavelength based on a diffraction beam from the wavelength reference marks; and performing recording while controlling the wavelength of the light source so as to reduce the wavelength shift.

According to another aspect of the present invention, there is provided a method for optical reproducing in which information recorded on an optical recording media utilizing holography is reconstructed, the method comprising: preparing an optical recording media having wavelength reference marks with a periodic structure which are associated with a recording base wavelength; irradiating the wavelength reference marks with a beam from a light source on reproducing information to detect a wavelength shift of the light source with respect to the base wavelength based on a diffraction beam from the wavelength reference marks; and performing reproducing while controlling the wavelength of the light source so as to reduce the wavelength shift.

According to still another aspect of the present invention, there is provided an optical recording media on which information is recorded utilizing holography comprising: an information recording region; and a region in which wavelength reference marks with a periodic structure are formed which are associated with a recording base wavelength based on diffraction of a recording beam and a reproducing beam.

According to yet another aspect of the present invention, there is provided an optical recording and reproducing apparatus which performs recording information to and reproducing information from an optical recording media utilizing holography, the optical recording media having an information recording region and a region in which wavelength reference marks with a periodic structure are formed which are associated with a recording base wavelength based on diffraction of a recording beam and a reproducing beam, the apparatus comprising: a light source; a spatial light modulator which generates an information beam and/or reference beam from a beam emitted from the light source; an optical system adapted to irradiate the information recording region of the optical recording media with the information beam and the reference beam that are a recording beam, to irradiate the information recording region of the optical recording media with the reference beam that is a reproducing beam, and to irradiate the region of the optical recording media in which the wavelength reference marks are formed with the recording beam or the reproducing beam; a photodetector detecting a wavelength shift of the light source with respect to the recording base wavelength based on a diffraction beam of the recording beam or reproducing beam with which the wavelength reference mark region of the optical recording media is irradiated; and a wavelength controller controlling a wavelength of the light source so as to reduce the wavelength shift.

BRIEF DESCRIPTION OF THE SEVERAL VIEWS OF THE DRAWING

FIG. 1 is a perspective view showing a disk-shaped optical recording media and an optical system located near the optical recording media according to an embodiment of the present invention;

FIG. 2 is a cross-sectional view showing wavelength reference marks provided in an optical recording media according to an embodiment of the present invention;

FIG. 3 is a perspective view showing the relationship between the wavelength reference marks and guides provided in an optical recording media according to the embodiment of the present invention;

FIGS. 4A and 4B are plan views showing the relationship between the wavelength reference marks and guides provided in the disk-shaped optical recording media in FIG. 1;

DETAILED DESCRIPTION OF THE INVENTION

Figure 5A:
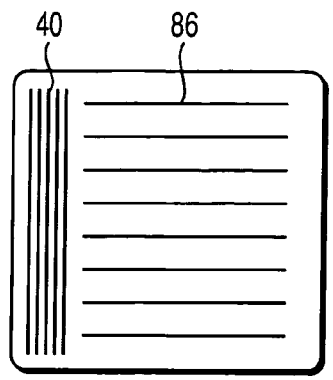
FIGS. 5A and 5B are plan views showing the relationship between wavelength reference marks and guides provided in a card-shaped optical recording media.

With reference to the drawings, a detailed description will be given of the best mode for carrying out the present invention. Elements common to all embodiments and examples are denoted by the same reference numerals with duplicate descriptions omitted. The figures referenced in the specification are schematic diagrams used to facilitate the description and understanding of the present invention. For the display of the drawings, shapes, sizes, ratios, and the like are different from those of the actual media and apparatus. However, the present invention is not limited to these descriptions. Further, the design may be appropriately altered taking into account the description below and well-known techniques.

Holography (hologram) according to embodiments of the present invention may be transmissive holography (transmissive hologram) or reflective holography (reflective hologram).

Either a two-beam interference method or a collinear interference method may be used as a method in which an information beam is interfered with a reference beam for an optical recording and reproducing apparatus using holography according to the embodiments of the present invention.

An optical recording media according to the embodiments of the present invention is typically shaped into a disk, a card, and a block. However, the shape of the optical recording media is not limited to these shapes.

FIG. 1 is a perspective view showing an optical recording media 1 to which the reflective collinear interference method is applied and an optical system located near the optical recording media 1 according to an embodiment of the present invention. The optical recording media 1 comprises an optical recording layer 3 on one principal surface (light incidence side) of a transparent substrate 4 formed of glass, polycarbonate, or the like. The optical recording media 1 further comprises a reflection layer 5 on the other principal surface and a protection layer 2 on the light incidence side of an optical recording layer 3. The protection layer 2 need not necessarily be provided.

The optical recording layer 3 is formed of a material that, when irradiated with an electromagnetic wave, varies its optical characteristics, such as a refractive index and an absorption coefficient, according to the intensity of the electromagnetic wave. A hologram recording material used for the optical recording layer 3 may be organic or inorganic. Possible organic materials include, for example, a photopolymer, a photorefractive polymer, and a photochromic dye dispersed polymer. Possible inorganic materials include, for example, lithium niobate and barium titanate.

The reflection layer 5 is formed of a material having a high reflectance at a recording beam wavelength, for example, aluminum. Although not shown, a structure such as protrusions and recesses may be formed to record information for tracking servo and address information on the principal surface of the transparent substrate 4, on which the reflection layer 5 is formed. A continuous servo system is preferably used for tracking servo. However, a sampled servo system may be used if a recording beam is disadvantageously disturbed in the reflection layer 5. For example, wobble pits may be used as information for tracking servo.

Recording beams (information beam and reference beam) are applied to the optical recording media 1 through the objective lens 7. The recording beams interfere with each other to form a hologram 6 in the optical recording layer 3.

FIG. 2 shows a cross-sectional view of the reflective optical recording media 1 shown in FIG. 1. In the optical recording media 1, the transparent substrate 4 has a region 85 where recessed portions are formed. Wavelength reference marks 40 are provided by forming a reflection layer 5 on the region 85. The wavelength reference marks 40 allow a diffraction beam depending on the recording beam wavelength to be emitted to the incidence side of a recording beam.

If guides 86 are formed on the principal surface of the transparent surface 4 to control the scan direction of the recording beam, the periodic direction of the wavelength reference marks 40 is desirably different from that of the guides 86. The perspective view in FIG. 3 shows an example in which the periodic direction of the wavelength reference marks 40 is almost orthogonal to that of the guides 86.

If the optical recording media 1 has a disk shape, the wavelength reference marks 40 may be radially formed as shown in the example in the plan view in FIG. 4A or may be formed at the beginning of each of recording sectors formed at equal intervals as shown in the example in the plan view in FIG. 4B.

Figure 5B:
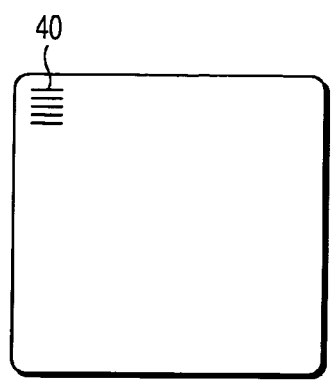

If the optical wavelength media 1 has a card shape and the guides 86, used to control the recording beam scan direction, are formed, the periodic direction of the wavelength reference marks 40 is desirably different from that of the guides 86 as shown in the example in the plan view in FIG. 5A. If the guides 86, used to control the recording beam scan direction, are not formed, the periodic direction of the wavelength reference marks 40 is not particularly restricted as shown in the example in the plan view in FIG. 5B.

Now, an example of an optical recording and reproducing apparatus using a refection type collinear holography will be described. With the conventional refection type collinear holography, if a reference beam is applied for reproducing, a diffraction beam as a reproducing beam and the remaining part of the transmission beam that has not been diffracted are collinearly incident on a photodetector. This disadvantageously reduces the SN ratio. A reflective polarization collinear interference system in which an information beam is separated from a reference beam based on polarized beam has been proposed as a new recording system that solves the above problem (see Jpn. Pat. Appln. KOKAI Publication No. 2002-123949, already described). A new collinear interference system has recently been proposed which uses one spatial light modulator to generate an information beam and a modulated reference beam to record a hologram and which separates the reference beam from the reproducing beam so that the reproducing beam and the reference beam are separately located at a central region and at a peripheral region to the optical axis (see Horimai et al., already described).

Figure 6:
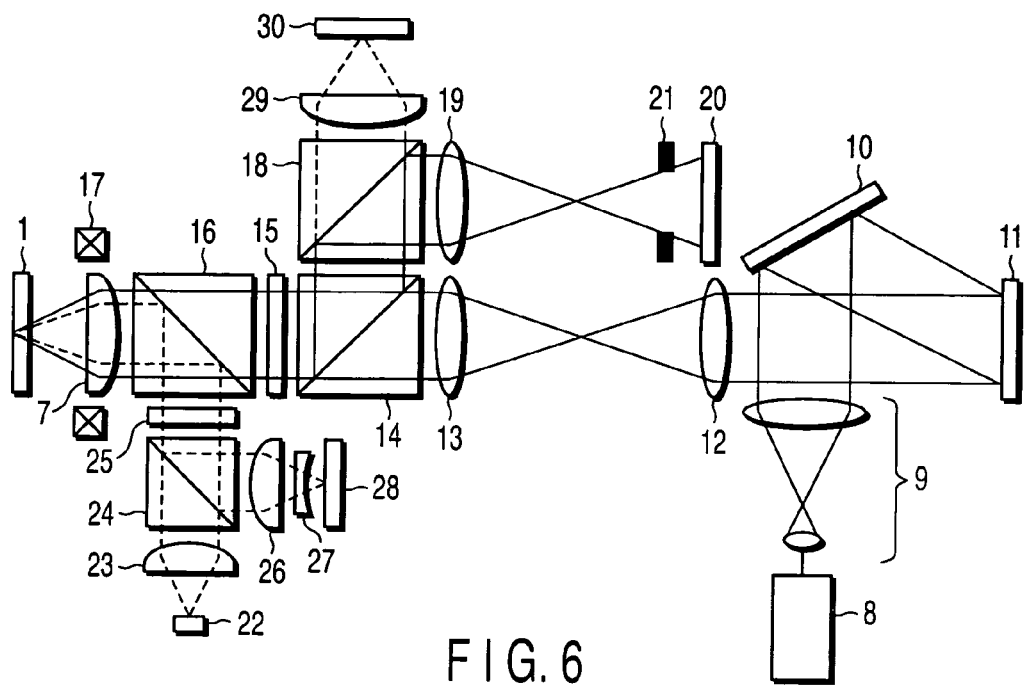
FIG. 6 is a schematic diagram of an optical recording and reproducing apparatus according to an embodiment of the present invention.

FIG. 6 shows a schematic diagram of an optical recording and reproducing apparatus using the collinear interference method. This apparatus uses the collinear method of using one spatial light modulator to generate an information beam and a modulated reference beam to record a hologram.

Figure 7:
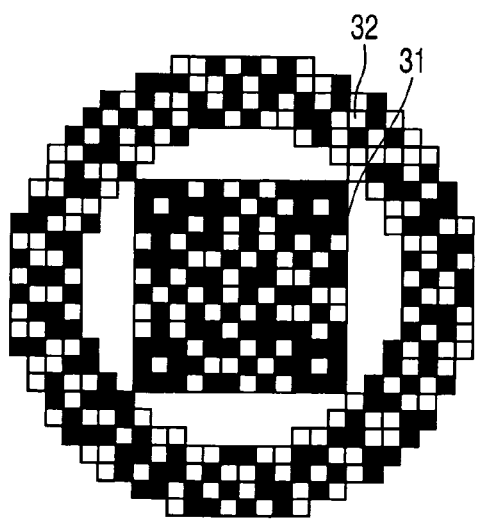
FIG. 7 is a plan view showing a modulation pattern displayed on a reflective spatial light modulator and corresponding to a recording beam (information beam and reference beam)

A light source 8 is desirably a laser with linear polarization in view of coherence. Specifically, the light source 8 may be a semiconductor laser, a He—Ne laser, an argon laser, or a YAG laser. The light source 8 has a function capable of adjusting its emission wavelength. A beam expander 9 expands and shapes a beam emitted from the light source 8 into a collimated beam. The shaped beam is applied to a reflective spatial light modulator 11 by a mirror. The reflective spatial light modulator 11 has a plurality of pixels two-dimensionally arrayed in a lattice. By varying the direction of a reflection beam at every pixel or by varying the polarizing direction of a reflection beam at every pixel, it is possible to simultaneously generate an information beam provided with information as a two-dimensional pattern and a spatially modulated reference beam. The reflective spatial light modulator 11 may be a digital mirror device, a reflective liquid crystal element, or a reflective modulator that uses a magneto-optic effect. FIG. 6 shows an example in which a digital mirror device is used as the reflective spatial light modulator. A modulation pattern such as the one shown in FIG. 7 is displayed on the reflective spatial light modulator 11. This modulation pattern corresponds to a recording beam. In the modulation pattern, the region near the center of the optical axis is used as an information beam region 31, and the peripheral region is used as a reference beam region 32.

The recording beam (information beam and reference beam) reflected by the reflective spatial light modulator 11 is incident on a polarization beam splitter 14 through imaging lenses 12 and 13. When the beam is emitted from the light source 8, its polarizing direction is adjusted so that it is transmitted through the polarization beam splitter 14. The recording beam transmitted through the polarization beam splitter 14 passes through a polarizing optical element 15, and then enters a dichroic prism 16. The polarizing optical element 15 may be a quarter wavelength plate, a half wavelength plate, or the like. The dichroic prism 16 is designed to transmit the wavelength of the recording beam. The beam transmitted through the dichroic prism 16 is applied to the optical recording media 1 by the objective lens 7 such that the beam is focused on a surface of the reflection layer 5 so as to minimize the beam size. In this manner, the optical recording media 1 is irradiated with the recording beam with the information beam corresponding to the central region near the optical axis and the reference beam corresponding to the peripheral region. Then, the information light and reference beam interfere with each other inside the optical recording layer 3 to form a hologram 6 in the optical recording media 1.

Figure 8:
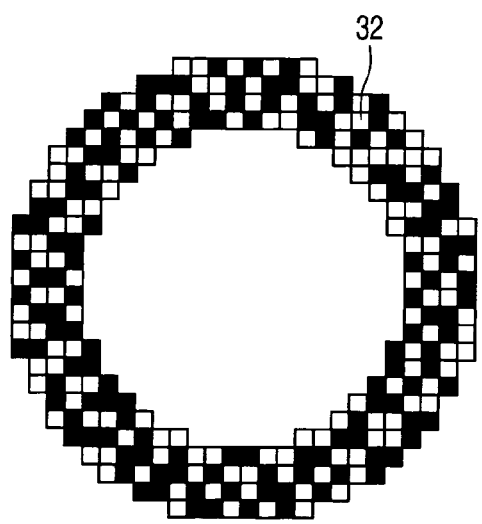
FIG. 8 is a plan view showing a modulation pattern displayed on the reflective spatial light modulator and corresponding to a reproducing beam (reference beam)

To reconstruct recorded information, the reference beam region 32 is displayed on the reflective spatial light modulator 11 as shown in FIG. 8 to irradiate the optical recording media 1 with the reference beam as in the case of recording. The reference beam region 32 shown in FIG. 8 shows the same modulation pattern as that of the peripheral reference beam region 32, shown in FIG. 7. When transmitted through the optical recording media 1, a part of the reference beam is diffracted by the hologram 6 to become a reproducing beam. The reproducing beam is reflected by the reflection layer 5 and then passes through the objective lens 7 and dichroic prism 16. When transmitted through the polarizing optical element 15, the reproducing beam contains a polarization component different from that of the reference beam. The beam is then reflected by the polarization beam splitter 14. The rotating angle by the polarizing optical element 15 is desirably adjusted so as to maximize the reflectance of the reproducing beam at the polarization beam splitter 14. Most of the reproducing beam reflected by the polarization beam splitter 14 is reflected by a beam splitter 18, and then is imaged on a two-dimensional photodetector 20 as a reproduced image by an imaging lens 19. A part of the reference beam which has not been diffracted by the hologram 6 becomes a transmission beam, which is imaged on the two-dimensional photodetector 20 similarly to the reproducing beam. However, since the central region of the beam corresponds to the reproducing beam and the peripheral region corresponds to the transmission beam, these beams can be easily separated from each other. To improve the SN ratio of the reproduced signal, an iris 21 may be disposed in front of the photodetector 20 to block the reference beam component.

Now, a servo method on the optical recording media 1 will be described. The optical recording and reproducing apparatus shown in FIG. 6 has a servo light source 22. The light source 22 is desirably a laser with linear polarization. Specifically, the light source 22 may be a semiconductor laser, a He—Ne laser, an argon laser, or a YAG laser. The light source 22 desirably has a wavelength different from that of the recording light source 8. Desirably, the light source 22 does not change the optical characteristics of the optical recording layer 3. The most desirable light source 22 is a red semiconductor laser with a wavelength of about 650 nm. A servo beam emitted from the light source 22 is shaped by a collimate lens 23 into a collimated beam. The shaped beam is incident on a polarization beam splitter 24. When the servo beam is emitted from the light source 22, its polarizing direction is adjusted so that it is transmitted through the polarization beam splitter 24. The servo beam transmitted through the polarization beam splitter 24 passes through a polarizing optical element 25, and then enters the dichroic prism 16. The polarizing optical element 25 may be a quarter wavelength plate, a half wavelength plate, or the like. The dichroic prism 16 is designed to transmit the wavelength of the servo beam. The servo beam reflected by the dichroic prism 16 is applied to the optical recording media 1 by the objective lens 7 such that the beam is focused on a surface of the reflection layer 5 so as to minimize the beam size. The servo beam is reflected by the reflection layer 5, where the beam is modulated by pits formed on the reflection surface. A servo return beam from the optical recording media 1 is transmitted through the objective lens 7, reflected by the dichroic prism 16 and further transmitted though the polarizing optical element 25. When transmitted through the polarizing optical element 25, the servo beam contains a polarization component different from that of the servo beam emitted from the light source 22. The beam is then reflected by the polarization beam splitter 24. The rotating angle by the polarizing optical element 25 is desirably adjusted so as to maximize the reflectance of the servo return beam at the polarization beam splitter 24. The servo return beam reflected by the polarization beam splitter 24 is transmitted through a convex lens 26 and a cylindrical lens 27, and then detected by a four-quadrant photodetector 28. An address signal, a focus error signal, and a tracking error signal are generated on the basis of an output from the four-quadrant photodetector.

Figure 9:
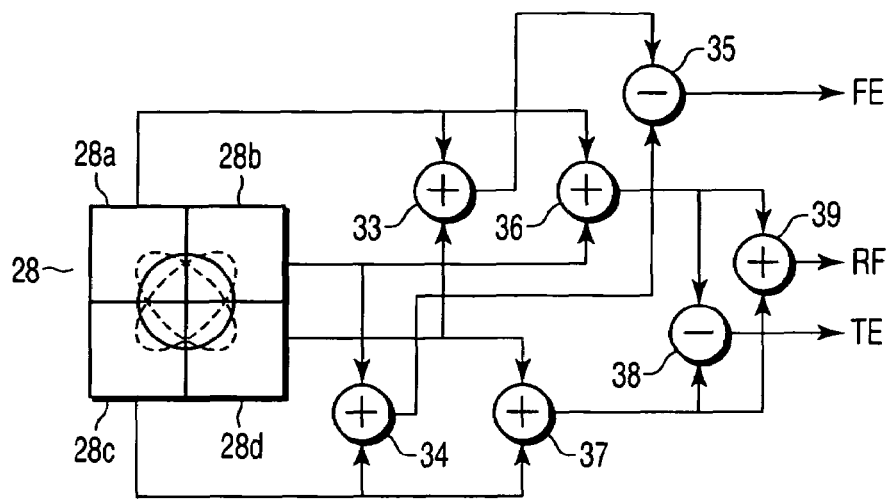
FIG. 9 is a block diagram showing a circuit used to detect a focus error signal and a tracking error signal.

FIG. 9 is a block diagram showing a circuit used for detecting a focus error signal and a tracking error signal on the basis of the output from the four-quadrant photodetector 28. This detection circuit generates a focus error signal FE, a tracking error signal TE, and a reproduced signal RF.

The focus error signal FE is generated using an adder 33 that adds outputs from light receiving sections 28a and 28d diagonally located in the four-quadrant photodetector 28, an adder 34 that adds outputs from light receiving sections 28b and 28c diagonally located in the four-quadrant photodetector 28, and a subtractor 35 that calculates the difference between an output from the adder 33 and an output from the adder 34 to generate the focus error signal FE on the basis of astigmatism.

The tracking error signal TE is generated using an adder 36 that adds outputs from the light receiving sections 28a and 28b located adjacent to each other in a track direction of the four-quadrant photodetector, an adder 37 that adds outputs from light receiving sections 28c and 28d located adjacent to each other in a track direction of the four-quadrant photodetector, and a subtractor 38 that calculates the difference between an output from the adder 36 and an output from the adder 37 to generate the tracking error signal TE on the basis of a push pull method.

The reproduced signal RF is generated by using an adder 39 that adds the outputs from the adders 36 and 37 to generate the reproduced signal RF. In the present embodiment, the reproduced signal RF is obtained by reproducing information prerecorded on the reflection layer 5 of the optical recording media 1.

The misalignment between the optical recording and reproducing apparatus and the optical recording media 5 is corrected by using a voice coil motor 17 shown in FIG. 6 to drive an objective lens 7 so as to zero the focus error signal FE and tracking error signal TE, obtained by the four-quadrant photodetector 28 as described above.

Now, an example of a method for detecting a wavelength shift from a base wavelength will be described. To detect a deviation in wavelength, it is desirable to turn on all the pixels in the reflective spatial light modulator 11, shown in FIG. 6, to irradiate the optical recording media 1 with a uniform beam. As in the case of recording and reproducing, a beam emitted from the light source 8 is propagated via the beam expander 9, the mirror 10, the reflective spatial light modulator 11, the imaging lenses 12 and 13, the polarization beam splitter 14, the polarizing optical element 15, the dichroic prism 16, and the objective lens 7, and then is applied to the optical recording media 1 by the objective lens 7 such that the beam is focused on a surface of the reflection layer 5 so as to minimize the beam size.

As shown in FIG. 2, the wavelength reference marks 40, shaped like diffraction gratings, are provided on the surface of the reflection layer 5 of the optical recording media 1. The region of the wavelength reference marks 40 is different from the information recording region in the optical recording media 1. When a beam from the light source 8 is incident on the wavelength reference marks 40, diffraction beams 42 and 43 appear together with a reflection beam 41 shown in FIG. 10. In the embodiments of the present invention, the diffraction beams are used to detect a wavelength shift from the base wavelength. As shown in FIG. 6, the reflection beam 41 and diffraction beams 42 and 43 from the wavelength reference marks 40 are transmitted again through the objective lens 7 and dichroic prism 16. When transmitted through the polarizing optical element 15, the beams contain a polarization component different from that of the incident beam, and then reflected by the polarization beam splitter 14. The reflection beam 41 and diffraction beams 42 and 43 reflected by the polarization beam splitter 14 are partly transmitted through the beam slitter 18 and then projected on a segmented photodetector 30.

Figure 11A:
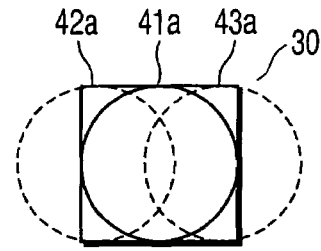
FIGS. 11A, 11B and 11C are schematic diagrams showing the state of reflection and diffraction beams on a segmented photodetector.
Figure 11B:
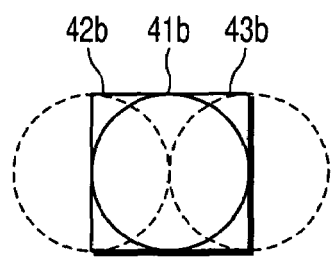
Figure 11C:
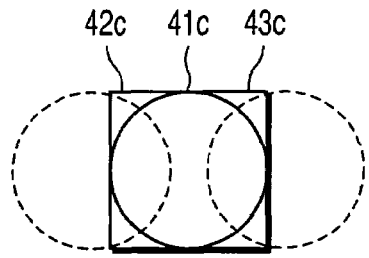

FIGS. 11A, 11B and 11C show the reflection beam 41 and diffraction beams 42 and 43 on the segmented photodetector 30. If the wavelength of the light source 8 matches the base wavelength, the beams are as shown in FIG. 11B. If the wavelength of the light source 8 shifts toward shorter wavelengths, the beams are as shown in FIG. 11A. If the wavelength of the light source 8 shifts toward longer wavelengths, the beams are as shown in FIG. 11C.

Figure 12:
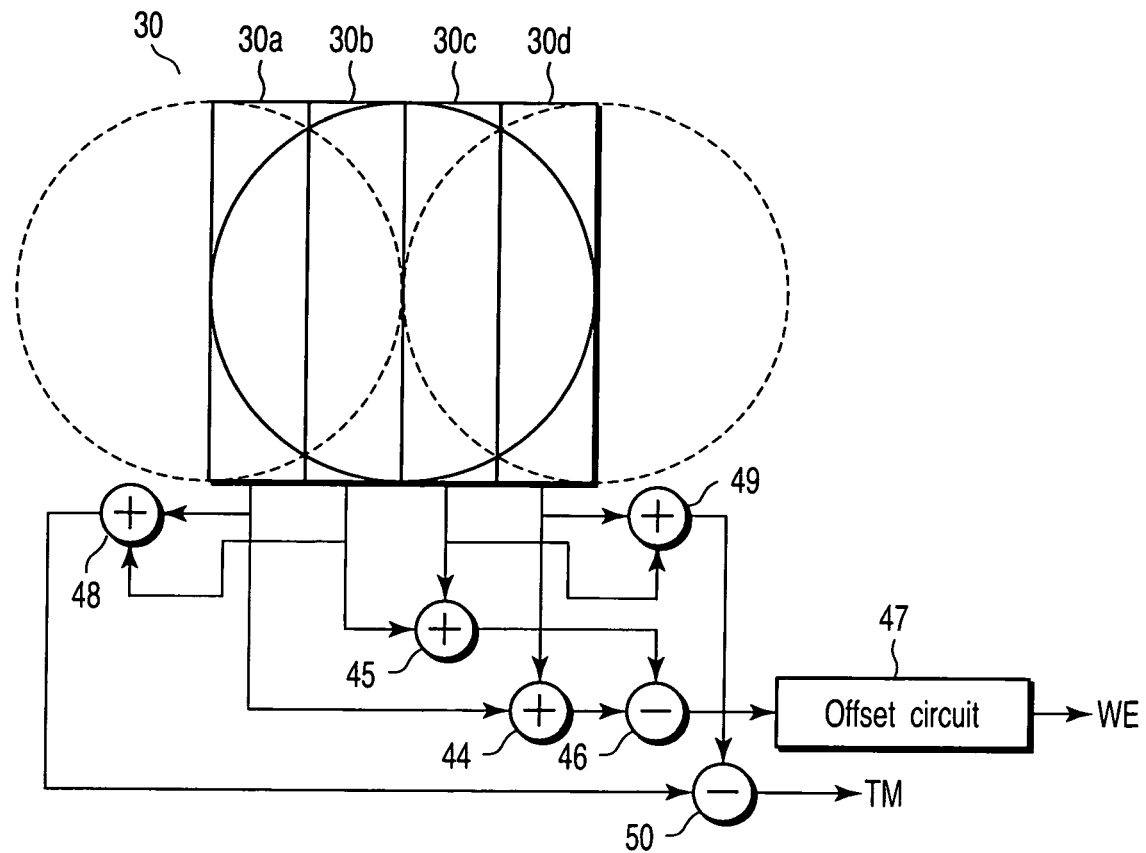
FIG. 12 is a block diagram showing a circuit used to detect a wavelength error signal.

FIG. 12 is a block diagram showing a circuit for detecting a wavelength error signal based on the output of the segmented photodetector 30. The segmented photodetector 30 is divided into four strips as shown in FIG. 12. This detection circuit comprises an adder 44 that adds outputs from outer light receiving sections 30a and 30d of the segmented photodetector 30, an adder 45 that adds outputs from inner light receiving sections 30b and 30c of the segmented photodetector 30, a subtractor 46 that calculates the difference between an output from the adder 44 and an output from the adder 45, and an offset circuit 47 that offsets an output from the subtractor 46. Further, the detection circuit must detect the base wavelength when the diffraction beams 42 and 43 are laterally symmetrically incident on the segmented photodetector 30. The circuit thus comprises an adder 48 that adds outputs from the light receiving sections 30a and 30b, corresponding to the half of the segmented photodetector 30, an adder 49 that adds outputs from the light receiving sections 30c and 30d, corresponding to the remaining half of the segmented photodetector 30, and a subtractor 50 that calculates the difference between an output from the adder 48 and an output from the adder 49 to generate a detection timing signal TM. Then, an output from the offset circuit 47 obtained when the detection timing signal TM becomes zero is used as a wavelength error signal WE. The two-dimensional photodetector 20 may be used as a substitution for the segmented photodetector so that a wavelength error signal can be similarly obtained using an output therefrom.

Figure 13:
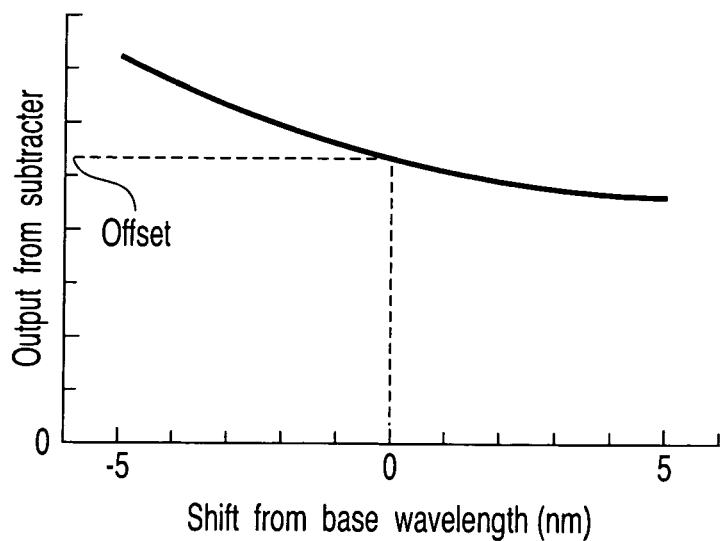
FIG. 13 is a diagram showing the relationship between an output from a subtractor 46 in a wavelength error detection circuit and a wavelength shift from the base wavelength of a recording beam.

Now, a wavelength error signal obtained by a segmented photodetector 30 shown in FIG. 12 will be described. FIG. 13 shows the relationship between an output from the subtractor 46 in the wavelength error detection circuit and a wavelength shift from the base wavelength of the recording beam. The output from the subtractor 46 is obtained by subtracting the output from the adder 44 from the output from the adder 45. Thus, the subtractor 46 also provides the output for the base wavelength. Accordingly, the offset circuit 47, shown in FIG. 12, offsets this output to obtain a wavelength error signal. The light source is subjected to feedback so that the output for the wavelength error signal becomes zero, thereby controlling the recording wavelength.

Figure 14:
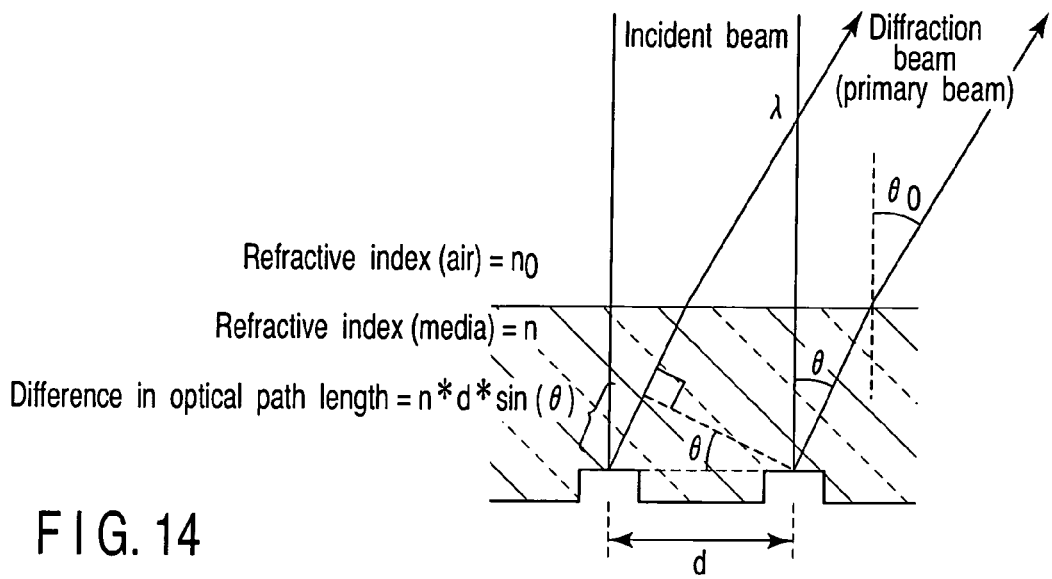
FIG. 14 is a schematic diagram showing how a plane wave is incident on a diffraction grating from a perpendicular direction.

Now, the period of the wavelength reference marks will be described. In the embodiments of the present invention, the diffraction gratings, serving as wavelength reference marks, are placed at the focus of the objective lens. Thus, a model is applicable in which a plane wave is incident on the diffraction gratings from the perpendicular direction as shown in FIG. 14. This figure shows that a plane wave of a wavelength λ passes through air (refractive index $n_0$) and enters diffraction gratings which are present in a media with a refractive index n and which have a period d. Beams diffracted by the two diffraction gratings have a difference in optical path length $n*d*\sin(\theta)$ in the media. A diffraction condition for a primary diffraction beam is $n*d*\sin(\theta)=\lambda$. Let θ be the diffraction angle in the media and let $\theta_0$ denote the diffraction angle in air. Then, on the basis of the Snell laws of refraction, $n*\sin(\theta)=n_0*\sin(\theta_0)$. Accordingly, $n*d*\sin(\theta)=n_0*d*\sin(\theta_0)=\lambda$. Therefore, when the refractive index $n_0$ of air is 1, the diffraction angle $\theta_0$ in air is expressed by Equation (1).

$$\sin(\theta_0)=\lambda/d. \tag{1}$$

Figure 15:
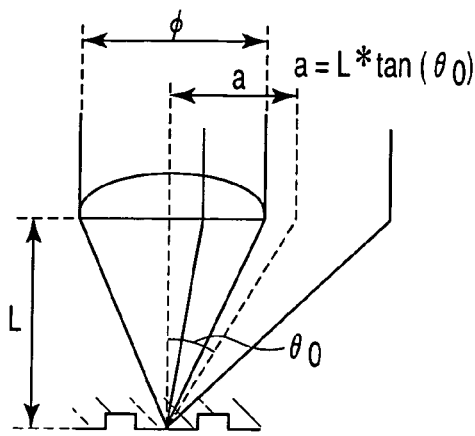
FIG. 15 is a schematic diagram showing the misalignment between the optical axis of a reflection beam and the optical axis of a diffraction beam at the position of an objective lens.

When the diffraction angle of the primary diffraction beam is defined as $\theta_0$ and the distance between the objective lens and the focus is defined as L as described above, if the thickness of the optical recording media is smaller than the value L, then misalignment a occurs between the optical axis of the reflection beam and the optical axis of the diffraction beam as shown in FIG. 15. The misalignment a between the optical axes can be approximated using Equation (2).

$$a=L*\tan(\theta_0). \tag{2}$$

Here, let NA be the numerical aperture of the objective lens in air, and let φ denote the diameter of the objective lens. Then, the distance between the objective lens and the focus can be approximate using Equation (3).

$$NA=\sin\{\tan^{-1}(\phi/2L)\}\approx\phi/2L,$$

$$L=\phi/2NA. \quad (3)$$

Then, with the approximation $\sin(\theta_0) \approx \tan(\theta_0)$, the relation shown by Equation (4) is obtained on the basis of Equations (1), (2), and (3).

$$d=\lambda*\phi/(2NA*a). \quad (4)$$

This is an equation that indicates the relationship between the period d of the wavelength reference marks 40 and the misalignment a between the reflection beam and the diffraction beam on the segmented photodetector 30, when the wavelength, the diameter of the objective lens, and the numerical aperture are given. If diffraction beams such as those shown in FIG. 11B contact each other without overlapping, then $a=\phi/2$ in FIG. 15. In this case, the period of the wavelength reference marks is $d=\lambda/NA$ on the basis of Equation (4).

Figure 16A:
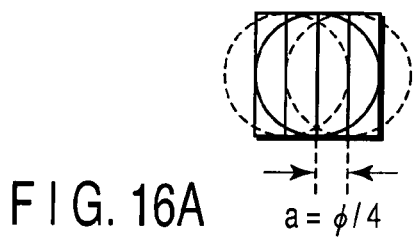
FIGS. 16A and 16B are schematic diagrams showing the positional relationship between reflection and diffraction beams on a segmented photodetector.
Figure 16B:
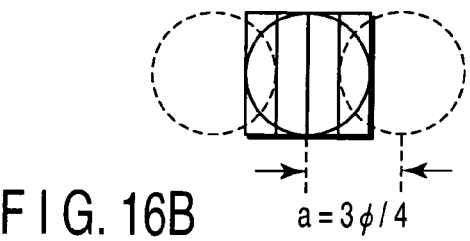

Here, the period of the wavelength reference marks suitable for detecting a wavelength shift will be considered. FIGS. 16A and 16B show the positional relationship between the reflection beam and the diffraction beam observed when a segmented photodetector is used which is divided into four strips as shown in FIG. 12. FIG. 16A shows that $a=\phi/4$ and that there is only a small misalignment between the reflection beam and the diffraction beam. When the misalignment is smaller than $\phi/4$, any of the light receiving sections of the segmented photodetector 30 detects the diffraction beam. This makes it difficult to discriminate the diffraction beam from the reflection beam. FIG. 16B shows that the misalignment a is equal to $3\phi/4$ and that there is a large misalignment between the reflection beam and the diffraction beam. When the misalignment a is larger than $3\phi/4$, the diffraction beam may not be detected by the light receiving section at the end of the segmented photodetector 30. Thus, it is desirable to meet the following equation: $\phi/4 \leq a \leq 3\phi/4$. Substituting this equation into Equation (4) determines the range of the period d of the wavelength reference marks to be $2\lambda/3NA \leq d \leq 2\lambda/NA$. The value d that meets this equation is the period of the wavelength reference which is suitable for detecting a wavelength shift according to the embodiments of the present invention. When $\lambda$ and NA have typical values, for example, 405 nm and 0.5, respectively, the range of d is 135 nm$\leq d \leq$405 nm.

Figure 10:
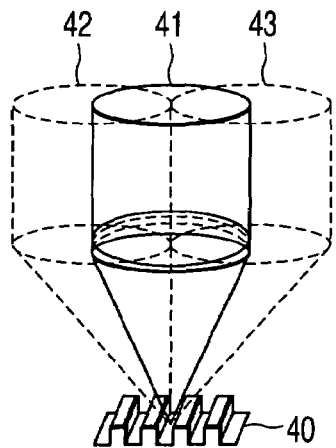
FIG. 10 is a perspective view showing a reflection beam and a diffraction beam that appear when a beam is incident on the wavelength reference marks.

The above description relates to the method of using the wavelength reference marks 40 shaped like diffraction gratinga as shown in FIG. 10 and the segmented photodetector 30 composed of strips as shown in FIG. 12. However, the structures of the wavelength reference marks and the segmented photodetector are not particularly limited. It is sufficient for the wavelength reference marks only to have such a periodic structure that generates a diffraction beam. The segmented photodetector may have a dividing direction that varies depending on the direction of a diffraction beam generated, or a plurality of dividing directions.

Figure 17:
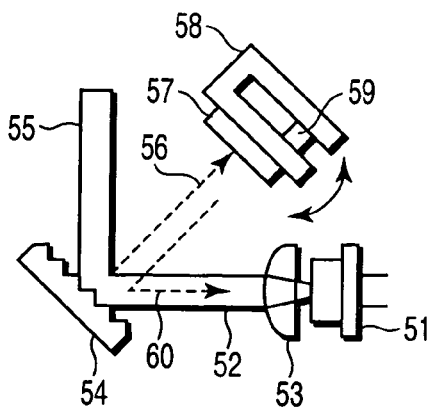
FIG. 17 is a schematic diagram of a semiconductor laser with an external resonator.

Now, an example of the light source 8 having a wavelength control function will be described. FIG. 17 is a schematic diagram of a semiconductor layer with an external resonator which can be used as the light source 8. Reference numeral 51 denotes a gallium nitride-based semiconductor laser of a central oscillation wavelength of 405 nm. A laser beam 52 emitted from the semiconductor laser is collimated by a collimate lens 53, and then is incident on diffraction gratings 54. A zero-order diffraction beam 55 resulted from reflection of the laser beam 52 by the diffraction gratings 54 is used as an output from the light source 8. On the other hand, a primary diffraction beam 56 diffracted by the diffraction gratings 54 is incident on a mirror 57. The mirror 57 is supported by a mount 58 that can have its angle varied around a perpendicular line to the sheet of the drawing as an axis. The angle thereof can be controlled by a voltage applied to a piezoelectric element 59. A reflection beam 60 resulted from reflection of the primary diffraction beam 56 by the mirror 57 is fed back to the semiconductor laser 51 via the diffraction gratings 54 and collimate lens 53. In this case, the external resonator is constituted by the semiconductor laser 51, the collimate lens 53, the diffraction gratings 54, and the mirror 57. The wavelength of the output beam 55 can be controlled with the angle of the mirror 57.

Figure 18A:
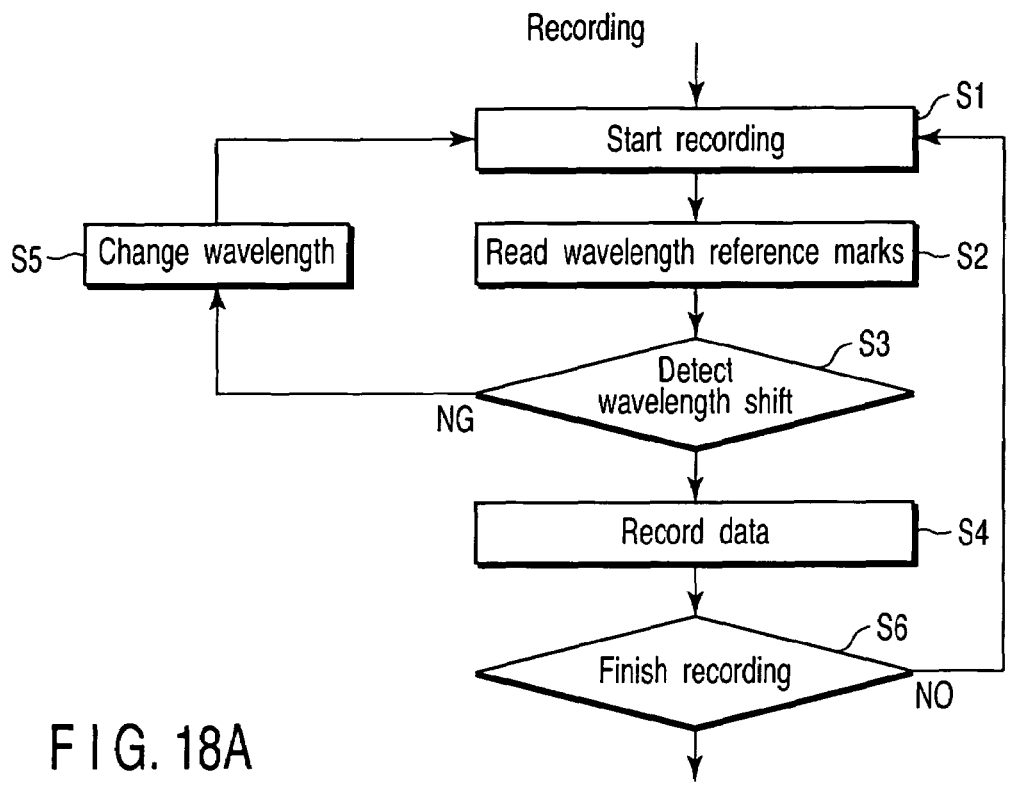
FIGS. 18A and 18B are flowcharts showing sequences used for recording and reproducing, respectively.
Figure 18B:
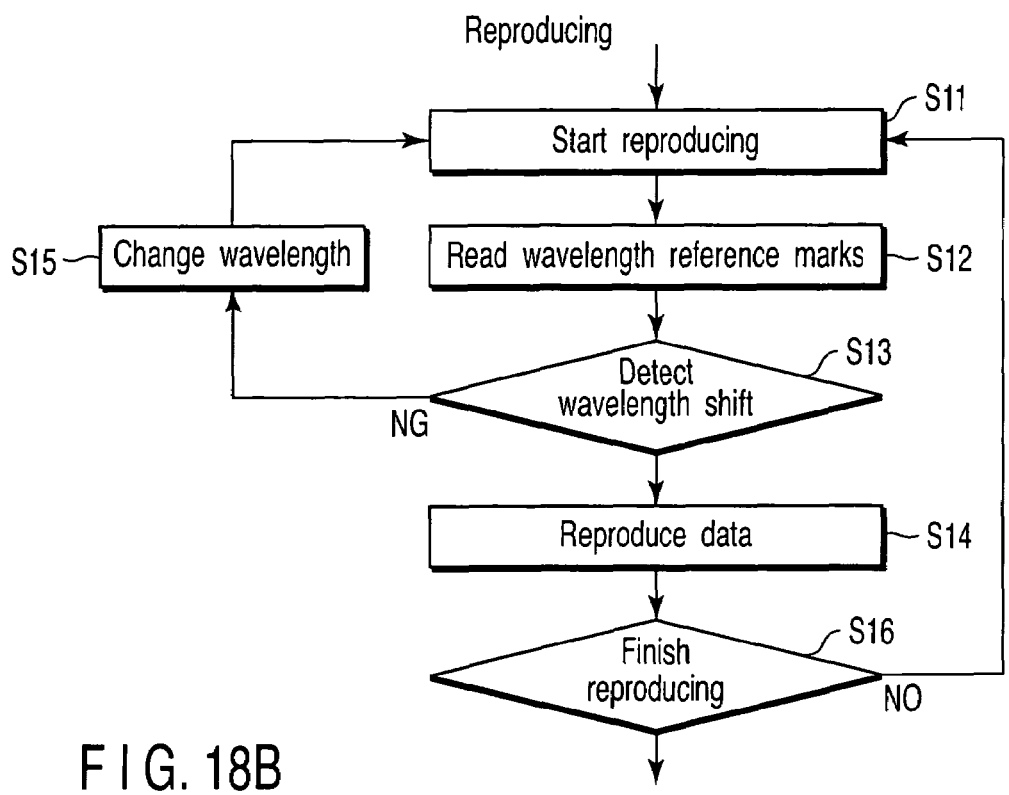

FIGS. 18A and 18B are flowcharts showing sequences for recording and reproducing, respectively.

As shown in FIG. 18A, recording is started (S1). First, the wavelength reference marks are read (S2). A wavelength shift is detected (S3). If there is no wavelength shift, data is recorded (S4). If a wavelength shift is detected (S3) and the wavelength shift is large, the wavelength is changed (S5). Then the wavelength reference marks are read again (S2) and a wavelength shift is detected (S3). If there is no wavelength shift, data is recorded (S4). Subsequently, the circuit determines whether or not the recording is to be finished (S6).

As shown in FIG. 18B, reproducing is started (S11). First, the wavelength reference data is read (S12). A wavelength shift is detected (S13). If there is no wavelength shift, data is reconstructed (S14). If a wavelength shift is detected (S13) and the wavelength shift is large, the wavelength is changed (S15). Then the wavelength reference marks are read again (S12), and a wavelength shift is detected (S13). If there is no wavelength shift, data is reconstructed (S14). Subsequently, the circuit determines whether or not the reproducing is to be finished (S16).

Thus, in the embodiments of the present invention, prior to data recording or reproducing, the wavelength of the light source is controlled by using the wavelength reference marks to detect a wavelength shift of the light source with respect to the base wavelength.

Figure 19:
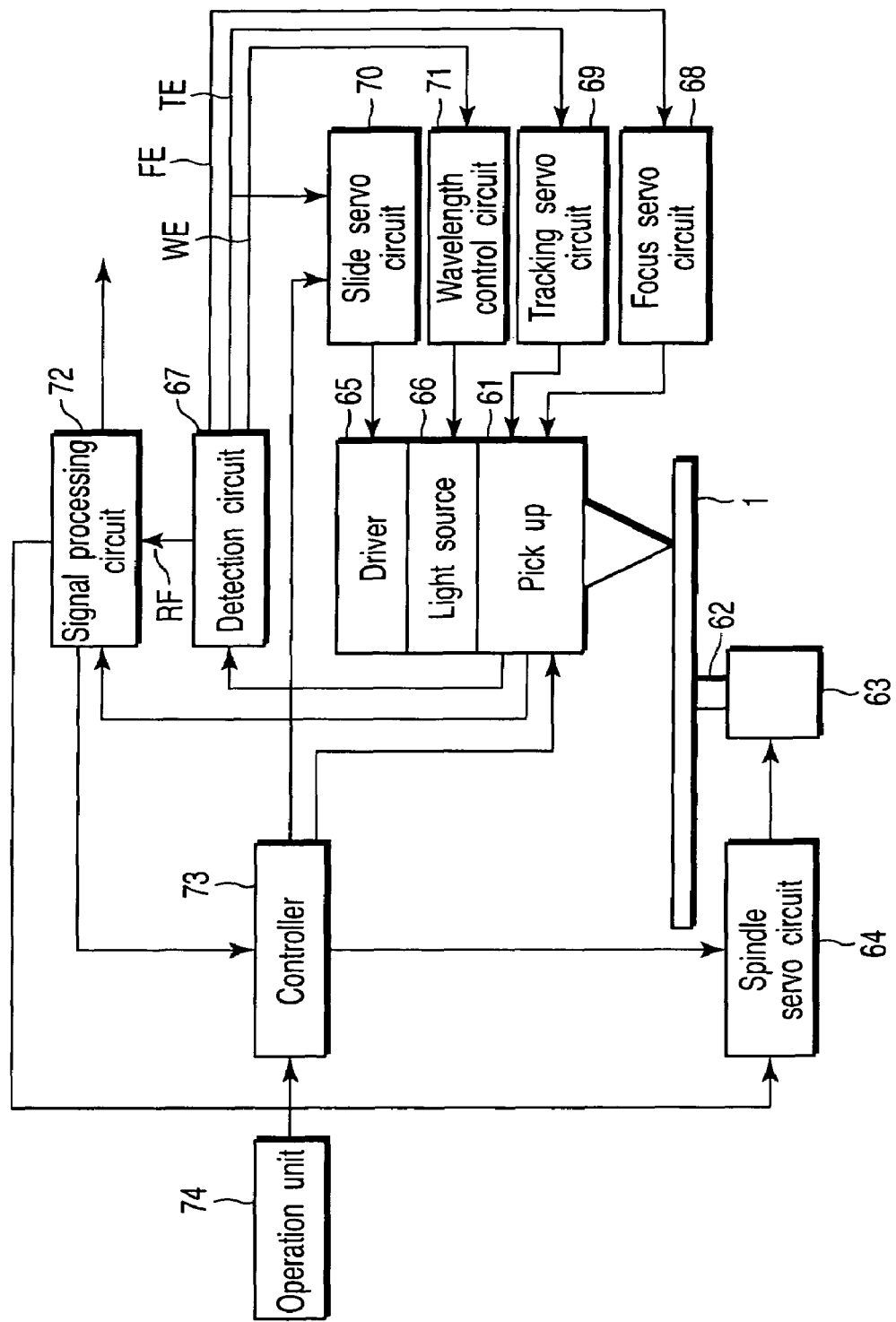
FIG. 19 is a diagram showing the configuration of an optical recording and reproducing apparatus according to an embodiment of the present invention.

With reference to FIG. 19, a setup of an optical recording and reproducing apparatus according to an embodiment of the present invention will be described. The optical recording and reproducing apparatus comprises a spindle 62 to which the optical recording media 1 is attached, a spindle motor 63 that rotates the spindle, and a spindle servo circuit 64 that controls the spindle motor so as to maintain the rotation speed of the optical recording media at a predetermined value. A stepping motor may be used instead of the spindle motor 63.

The optical recording and reproducing apparatus comprises a pickup 61 which records information by irradiating the optical recording media 1 with an information beam and a recording reference beam and which reconstructs information recorded in the optical recording media 1 by irradiating the optical recording media 1 with reproducing reference beam and detecting a reproducing beam, a light source 66 capable of controlling the wavelength, and a driver 65 that can move the pickup 61 and light source 66 in a radial direction of the optical recording media 1.

The optical recording and reproducing apparatus comprises: a detection circuit 67 that detects the focus error signal FE, tracking error signal TE, wavelength error signal WE, and reproduced signal RF based on an output signal from the pickup 61; a focus servo circuit 68 that performs focus servo by driving an actuator in the pickup 61 to move the objective lens in the thickness direction of the optical recording media 1; a tracking servo circuit 69 that performs tracking servo by driving the actuator in the pickup 61 on the basis of the tracking error signal TE detected by the detection circuit 67 to move the objective lens in the radial direction of the optical recording media 1; a slide servo circuit 70 that performs slide servo by controlling the driver 65 on the basis of the tracking error signal TE and an instruction from a controller described below to move the pickup 61 in the radial direction of the optical recording media 1; and a wavelength control circuit 71 that controls the wavelength by driving a wavelength selection circuit in the light source 66 on the basis of the wavelength error signal WE detected by the detection circuit 67.

The optical recording and reproducing apparatus further comprises: a signal processing circuit 72 that decodes output data from a two-dimensional photodetector in the pickup 61 to reconstruct data recorded in an information recorded region of the optical recording media 1 or to reproduce a basic clock or determine an address from the reproduced signal RF from the detection circuit 67; a controller 73 that controls the whole optical recording and reproducing apparatus; and an operation unit 74 that gives various instructions to the controller. The controller 73 receives the basic clock and address information output by the signal processing circuit 72. The controller 73 also controls the pickup 61, the spindle servo circuit 64, the slide servo circuit 70, the wavelength control circuit 71, and the like. The spindle servo circuit 64 receives the basic clock output by the signal processing circuit 72. The controller 73 includes a CPU (Central Processing Unit), ROM (Read Only Memory), and RAM (Random Access Memory). The functions of the controller 73 are realized by the CPU by using the RAM as a work area to execute a program stored in ROM.

The embodiments of the present invention may adopt many variations as described below. For example, instead of the digital mirror device, a reflective liquid crystal element or reflective magneto-optic element may be used as the spatial light modulator. The optical recording media 1 may have a dichroic reflection layer (see Horimai et al., described above). On the other hand, a transmissive optical recording media may be used as the optical recording media 1. Further, the method in which the information and reference beams interfere with each other may be either the collinear interference method or the two-beam interference method. The variations will be described below.

Figure 20:
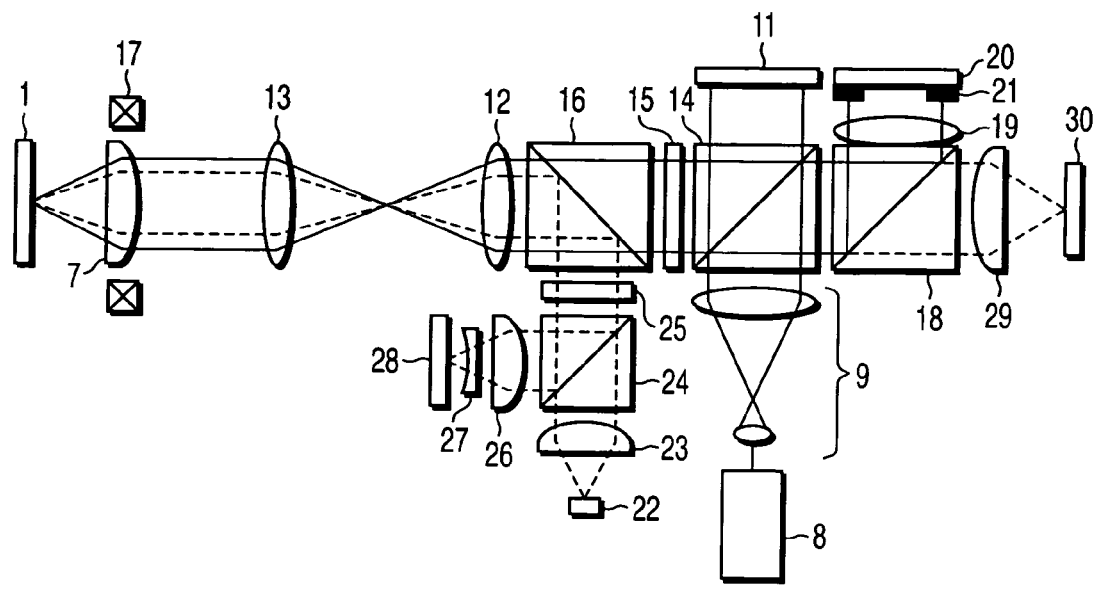
FIG. 20 is a schematic diagram of an optical recording and reproducing apparatus using a reflective spatial light modulator modulating a beam by changing a polarizing direction.

Description will be given of an optical recording and reproducing apparatus to which a reflective spatial light modulator is adopted which modulates a beam by allowing the beam to apply perpendicularly on an element, such as a reflective liquid crystal element or a reflective magneto-optic element, to change the polarizing direction. FIG. 20 is a schematic diagram of an optical recording and reproducing apparatus using a reflective spatial light modulator that modulates a beam by changing the polarizing direction thereof.

The basic configuration of the optical recording and reproducing apparatus shown in FIG. 20 is almost the same as that of the apparatus shown in FIG. 6 based on the reflective collinear interference method. The light source 8 is desirably a laser having a wavelength control function. The beam expander 9 expands and shapes a beam emitted from the light source 8 into a collimated beam. The shaped beam is incident on the polarization beam splitter 14. When the beam is emitted from the light source 8, the beam is adjusted for the polarizing direction so that it is transmitted through the polarization beam splitter 14. A recording beam transmitted through the polarization beam splitter 14 is then incident on the reflective spatial light modulator 11. The reflective spatial light modulator 11 has a plurality of pixels two-dimensionally arrayed in a lattice. By varying the polarizing direction of a reflection beam at every pixel, it is possible to simultaneously generate an information beam provided with information as a two-dimensional pattern and a spatially modulated reference beam. A modulation pattern such as the one shown in FIG. 7 is displayed on the reflective spatial light modulator 11. In the modulation pattern, the region near the center of the optical axis is used as an information beam region 31, and the peripheral region is used as a reference beam region 32.

The recording beam (information beam and reference beam) modulated by the reflective spatial light modulator 11 has a polarization component different from that constituting the recording beam before incidence. The recording beam is reflected by the polarization beam splitter 14 and then transmitted through the polarizing optical element 15, and then enters the dichroic prism 16. The dichroic prism 16 is designed to transmit the wavelength of the recording beam. The recording beam transmitted through the dichroic prism 16 passes through the imaging lenses 12 and 13, and then is applied to the optical recording media 1 by the objective lens 7 such that the beam is focused on a surface of the reflection layer 5 so as to minimize the beam size. In this manner, the optical recording media 1 is irradiated with the recording beam, with the information beam corresponding to the central region near the optical axis and the reference beam corresponding to the peripheral region. Then, the information beam and reference beam interfere with each other inside the optical recording layer 3 to form a hologram 6 in the optical recording media 1.

To reconstruct recorded information, the reference beam region 32 is displayed on the reflective spatial light modulator 11 as shown in FIG. 8 to irradiate the optical recording media 1 with the reference beam as in the case of recording. The reference beam region 32 shown in FIG. 8 shows the same modulation pattern as that of the peripheral reference beam region 32, shown in FIG. 7. When transmitted through the optical recording media 1, a part of the reference beam is diffracted by the hologram 6 to become a reproducing beam. The reproducing beam is reflected by the reflection layer 5 and then passes through the objective lens 7, imaging lenses 13 and 12, and dichroic prism 16. When transmitted through the polarizing optical element 15, the reproducing beam contains a polarization component different from that of the reference beam. The beam is then transmitted through the polarization beam splitter 14. The rotating angle by the polarizing optical element 15 is desirably adjusted so as to maximize the transmittance of the reproducing beam at the polarization beam splitter 14. Most of the reproducing beam transmitted through the polarization beam splitter 14 is reflected by a beam splitter 18, and then is imaged on a two-dimensional photodetector 20 as a reproduced image by an imaging lens 19. A part of the reference beam which has not been diffracted by the hologram 6 becomes a transmission beam, which is imaged on the two-dimensional photodetector 20 similarly to the reproducing beam. However, since the central region of the beam corresponds to the reproducing beam and the peripheral region corresponds to the transmission beam, these beams can be easily separated from each other. To improve the SN ratio of the reproduced signal, the iris 21 may be disposed in front of the photodetector 20 to block the reference beam component. The servo method used by the apparatus in FIG. 20 is the same as that described for the apparatus in FIG. 6.

Now, an example of a method for detecting a wavelength shift from a base wavelength when the apparatus shown in FIG. 20 is used will be described. To detect a wavelength shift, it is desirable to turn on all the pixels in the reflective spatial light modulator 11, shown in FIG. 20, to irradiate the optical recording media 1 with a uniform beam. As in the case of recording and reproducing, a beam emitted from the light source 8 is propagated via the beam expander 9, the polarization beam splitter 14, the reflective spatial light modulator 11, the polarizing optical element 15, the dichroic prism 16, the imaging lenses 12 and 13, and the objective lens 7, and then is applied to the optical recording media 1 by the objective lens 7 such that the beam is focused on a surface of the reflection layer 5 so as to minimize the beam size.

As shown in FIG. 2, the wavelength reference marks 40, shaped like diffraction gratings, are provided on the surface of the reflection layer 5 of the optical recording media 1. The reflection beam 41 and diffraction beams 42 and 43 from the wavelength reference marks 40 are transmitted again through the objective lens 7, imaging lenses 13 and 12, and dichroic prism 16. When transmitted through the polarizing optical element 15, the beams contain a polarization component different from that of the incident beam, and then transmitted through the polarization beam splitter 14. The reflection beam 41 and diffraction beams 42 and 43 transmitted through the polarization beam splitter 14 are partly transmitted through the beam slitter 18 and then projected on the segmented photodetector 30 by the lens 29. The segmented photodetector 30 provides a wavelength error signal. The two-dimensional photodetector 20 may be used as a substitution for the segmented photodetector so that a wavelength error signal can be similarly obtained using an output therefrom.

Figure 21:
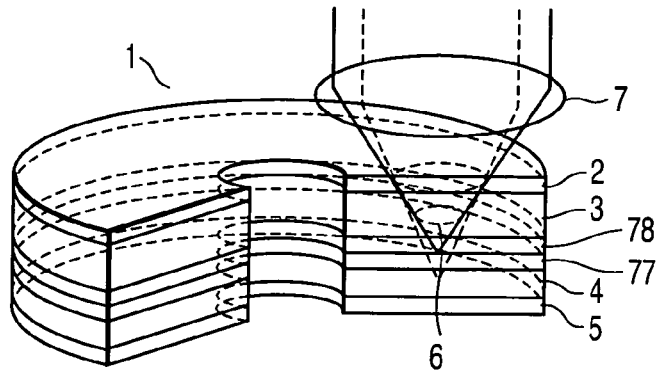
FIG. 21 is a perspective view of an optical recording media having a dichroic reflection layer.

Now, an optical recording media having a dichroic reflection layer will be described. FIG. 21 is a perspective view of the optical recording media 1 having a dichroic reflection layer used for the reflective collinear interference method. The optical recording media 1 comprises a dichroic reflection layer 77 and a gap layer 78 in addition to the configuration shown in FIG. 1. The dichroic reflection layer 77 reflects a recording beam emitted from the light source 8, while transmitting a servo beam emitted from the servo light source 23. The dichroic reflection layer 77 is formed of, for example, a dielectric multilayer film. Possible materials forming the dielectric multilayer film include $SiO_2$, $TiO_2$, $NbO_3$, and $CaF_2$. The gap layer 78 has a function for avoiding hologram recording in an area where a recording beam is focused and the intensity thereof is increased. However, the gap layer 78 need not necessarily be provided. It is sufficient for the material for the gap layer 78 to transmit the recording beam and to be incompatible with the recording material for the optical recording layer 3. The material for the gap layer 78 is, for example, glass or polycarbonate.

In hologram recording, a recording beam is applied to the optical recording media 1 by the objective lens 7 such that the beam is focused on a surface of the dichroic reflection layer 77 so as to minimize the beam size. A hologram 6 is thus formed in the optical recording layer 3. On the other hand, a servo beam is transmitted through the dichroic reflection layer 77, and is focused on a surface of the reflection layer 5 so as to minimize the beam size. The recording and servo beams can be focused on different positions by, for example, using an objective lens with a chromatic aberration, widening the spacing between the servo light source 22 and the collimate lens 23, or interposing a correcting concave lens between the polarizing optical element 25 and the dichroic prism 16.

Figure 22:
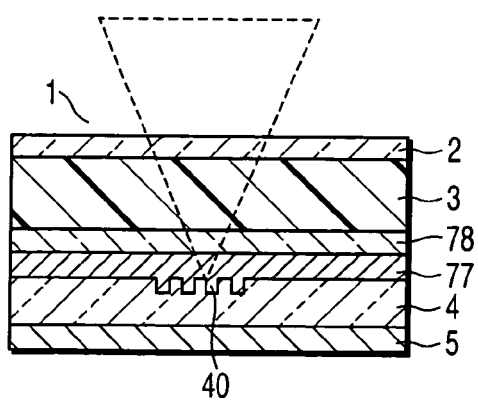
FIG. 22 is a cross-sectional view of the optical recording media in FIG. 21.

FIG. 22 shows a cross-sectional view of a reflective optical recording media having the dichroic reflection layer shown in FIG. 21. The wavelength reference marks 40 are provided at the interface between the transparent substrate 4 and the dichroic reflection layer 77. The wavelength reference marks 40 are adapted to emit a diffraction beam depending on to the recording beam wavelength toward the recording beam incidence side.

Figure 23:
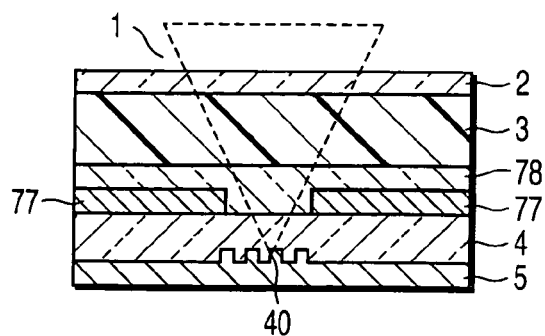
FIG. 23 is another cross-sectional view of the optical recording media in FIG. 21.

FIG. 23 shows another cross-sectional view of a reflective optical recording media having the dichroic reflection layer shown in FIG. 21. The wavelength reference marks 40 are provided at the interface between the transparent substrate 4 and the reflection layer 5. A part of the dichroic reflection layer 77 located above the wavelength reference marks is eliminated. This structure enables the recording beam to be focused on the wavelength reference marks 40.

Figure 24:
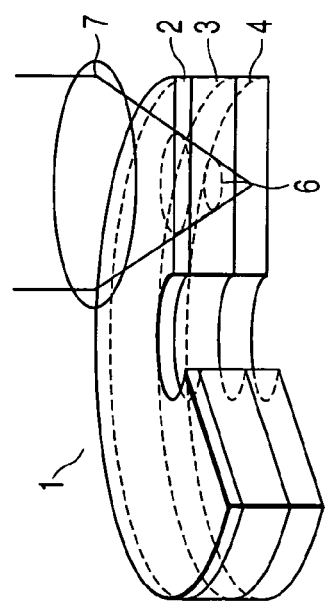
FIG. 24 is a perspective view of an optical recording media used for a transmissive collinear interference method.
Figure 25:
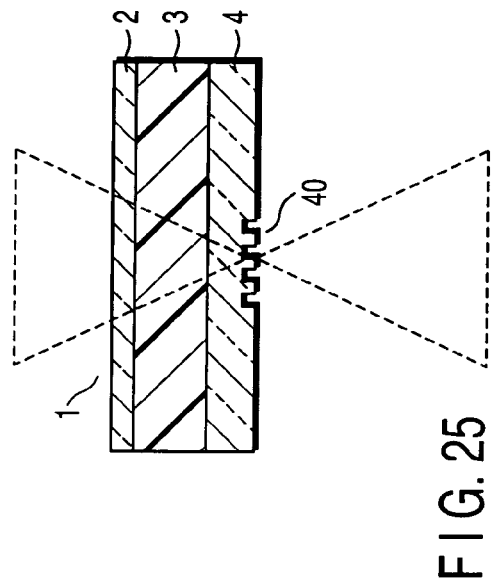
FIG. 25 is a cross-sectional view of the optical recording media in FIG. 24.

Now, an example in which a transmissive collinear interference method is applied to the present invention will be described. FIG. 24 shows a perspective view of an optical recording media used for the transmissive collinear interference method. The disk-shaped optical recording media 1 used for the transmissive collinear interference method shown in FIG. 24 has such a structure that the reflection layer 5 is removed from the optical recording media 1 shown in FIG. 1. FIG. 25 shows a cross-sectional view of the transmissive optical recording media shown in FIG. 24. The wavelength reference marks 40 are provided at an outer interface of the transparent substrate 4. The wavelength reference marks 40 are adapted to emit a diffraction beam depending on the recording beam wavelength toward the recording beam transmission side.

Figure 26:
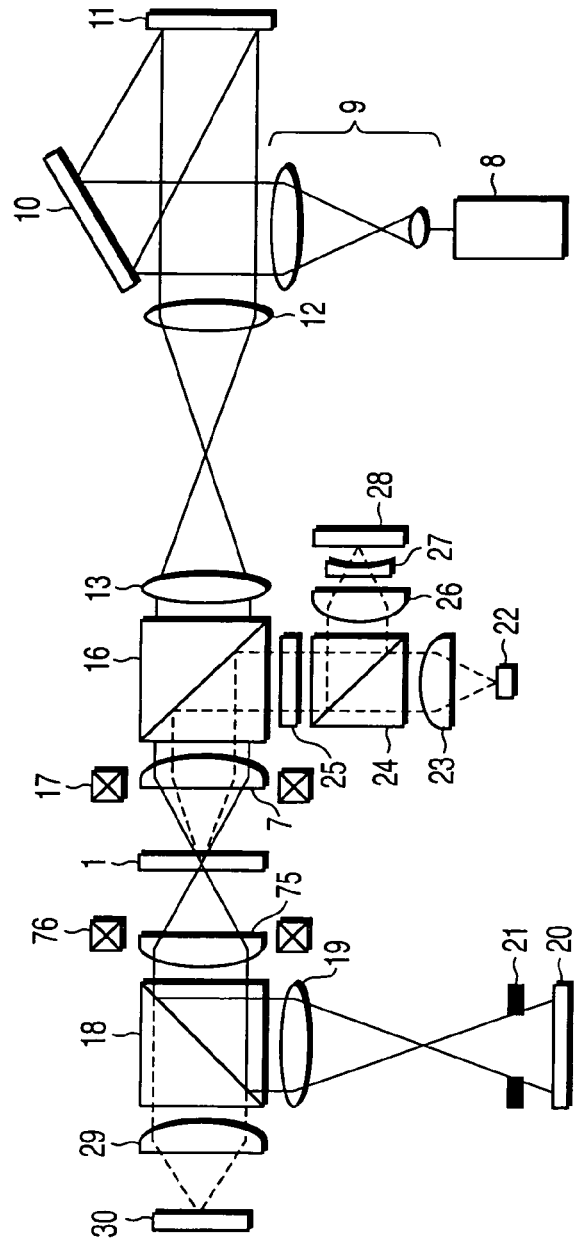
FIG. 26 is a schematic diagram of an optical recording and reproducing apparatus using the transmissive collinear interference method.

FIG. 26 shows a schematic diagram of an optical recording and reproducing apparatus using a transmissive collinear interference method. The basic configuration of the optical recording and reproducing apparatus shown in FIG. 26 is almost the same as that of the apparatus shown in FIG. 6 based on the reflective collinear interference method. The light source 8 is desirably a laser having a wavelength control function. The beam expander 9 expands and shapes a beam emitted from the light source 8 into a collimated beam. The shaped beam in applied to the reflective spatial light modulator 11 by the mirror 10. The reflective spatial light modulator 11 has a plurality of pixels two-dimensionally arranged in a lattice. By varying the direction of a reflection beam at every pixel or by varying the polarizing direction of a reflection beam at every pixel, it is possible to simultaneously generate an information beam provided with information as a two-dimensional pattern and a spatially modulated reference beam. FIG. 26 shows an example in which a digital mirror device is used as the reflective spatial light modulator 11. A modulation pattern such as the one shown in FIG. 7 is displayed on the reflective spatial light modulator 11. In the modulation pattern, the region near the center of the optical axis is used as an information beam region 31, and the peripheral region is used as a reference beam region 32.

The recording beam (information beam and reference beam) reflected by the reflective spatial light modulator 11 enters the dichroic prism 16 via the imaging lenses 12 and 13. The dichroic prism 16 is designed to transmit the wavelength of the recording beam. The beam transmitted through the dichroic prism 16 is applied to the optical recording media 1 by the objective lens 7 such that the beam is focused on the outer interface of the transparent substrate 4 of the optical recording media 1 so as to minimize the beam size. In this manner, the optical recording media 1 is irradiated with the recording beam, with the information beam corresponding to the central region near the optical axis and the reference beam corresponding to the peripheral region. Then, the information beam and reference beam interfere with each other inside the optical recording layer 3 to form a hologram 6 in the optical recording media 1.

To reconstruct recorded information, the reference beam region 32 is displayed on the reflective spatial light modulator 11 as shown in FIG. 8 to irradiate the optical recording media 1 with the reference beam as in the case of recording. The reference beam region 32 shown in FIG. 8 shows the same modulation pattern as that of the peripheral reference beam region 32, shown in FIG. 7. When transmitted through the optical recording media 1, a part of the reference beam is diffracted by the hologram 6 to become a reproducing beam. The reproducing beam is emitted so as to pass through the optical recording media 1. The beam is then transmitted through a pickup lens 75 and enters the beam splitter 18. Most of the reproducing beam is reflected by the beam splitter 18, and then is imaged on a two-dimensional photodetector 20 as a reproduced image by an imaging lens 19. A part of the reference beam which has not been diffracted by the hologram 6 becomes a transmission beam, which is imaged on the two-dimensional photodetector 20 similarly to the reproducing beam. However, since the central region of the beam corresponds to the reproducing beam and the peripheral region corresponds to the transmission beam, these beams can be easily separated from each other. To improve the SN ratio of the reproduced signal, the iris 21 may be disposed in front of the photodetector 20 to block the reference beam component.

The servo method used by the apparatus in FIG. 26 is the same as that described for the apparatus in FIG. 6 except that a part of the servo beam is reflected by the outer interface of the transparent substrate 4 and is then modulated by pits formed on the outer surface of the transparent substrate 4. Further, a voice coil motor 76 may be driven to position the pickup lens 75 by using the focus error signal and tracking error signal provided by the four-quadrant photodetector 28.

Now, an example of a method for detecting a wavelength shift from a base wavelength when the apparatus shown in FIG. 26 is used will be described. To detect a wavelength shift, it is desirable to turn on all the pixels in the reflective spatial light modulator 11, shown in FIG. 26, to irradiate the optical recording media 1 with a uniform beam. As in the case of recording and reproducing, a beam emitted from the light source 8 is propagated via the beam expander 9, the mirror 10, the reflective spatial light modulator 11, the imaging lenses 12 and 13, the polarization beam splitter 14, the polarizing optical element 15, the dichroic prism 16, and the objective lens 7, and then is applied to the optical recording media 1 by the objective lens 7 such that the beam is focused on the outer interface of the transparent substrate 4 of the optical recording media 1 so as to minimize the beam size.

As shown in FIG. 25, the wavelength reference marks 40, shaped like diffraction gratings, are provided at the outer interface of the transparent substrate 4 of the optical recording media 1. When a beam from the light source 8 is incident on the wavelength reference marks 40, a diffraction beam appears in addition to a transmission beam. The reflection beam and diffraction beams from the wavelength reference marks 40 are transmitted through the pickup lens 75. Then, the beams are partly transmitted through the beam slitter 18 and then projected on the segmented photodetector 30 by the lens 29. The segmented photodetector 30 provides a wavelength error signal. The two-dimensional photodetector 20 may be used as a substitution for the segmented photodetector so that a wavelength error signal can be similarly obtained using an output therefrom.

Figure 27:
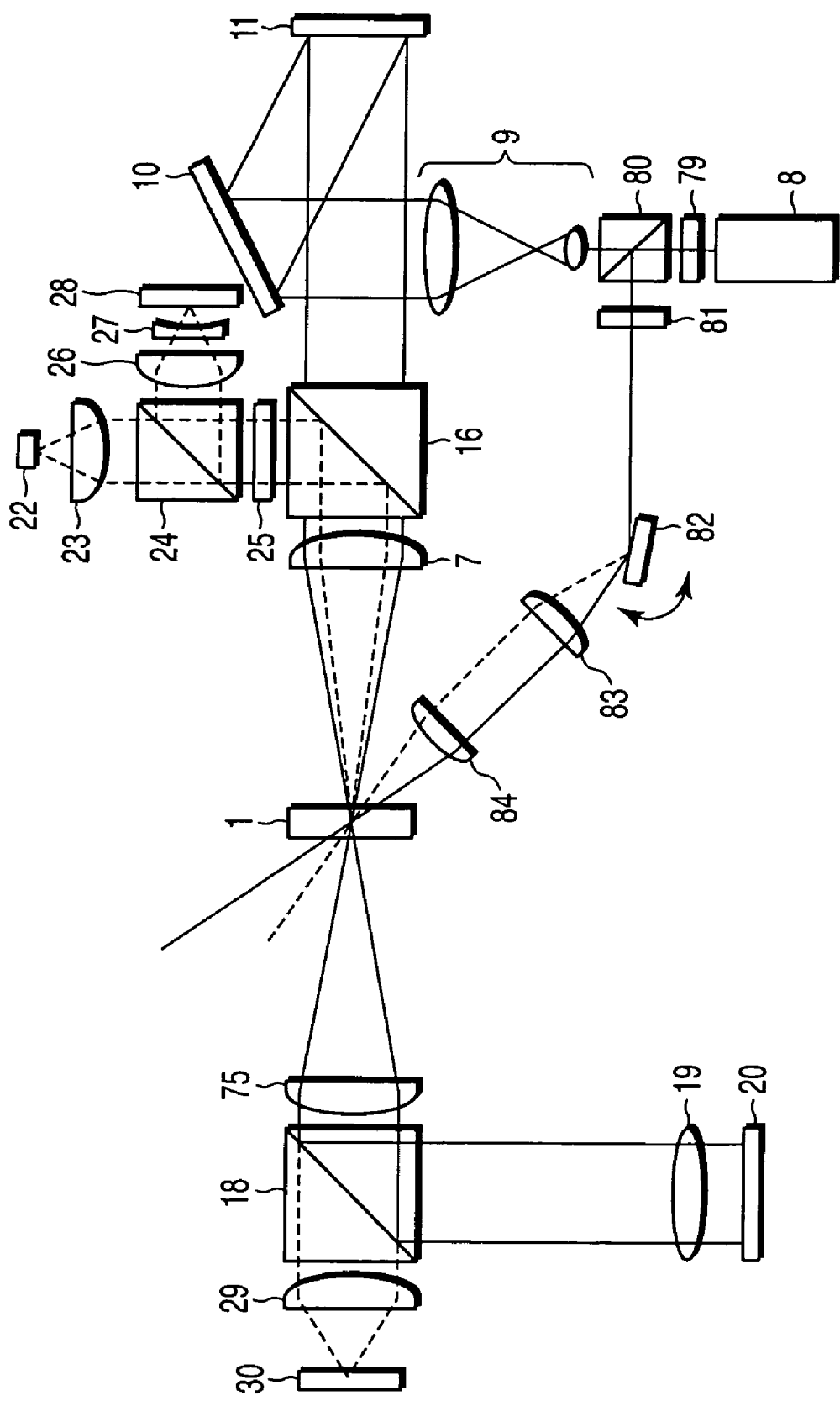
FIG. 27 is a schematic diagram of an optical recording and reproducing apparatus using a transmissive two-beam interference method.

Now, an example in which a transmissive two-beam interference method is applied to the present invention will be described. The optical recording media may have a structure similar to those of the transmissive media shown in FIGS. 24 and 25. FIG. 27 shows an example of an optical recording and reproducing apparatus using the transmissive two-beam interference method. The light source 8 is desirably a laser having a wavelength control function. A beam emitted from the light source 8 is first split into two beams by a polarizing optical element 79 and a polarization beam splitter 80. The polarizing optical element 79 may be a quarter wavelength plate, a half wavelength plate, or the like. The beam transmitted through the polarization beam splitter 80 is used as an information beam. The beam expander 9 expands and shapes the information beam into a collimated beam. The shaped beam is applied to the reflective spatial light modulator 11 by the mirror 10. The reflective spatial light modulator 11 has a plurality of pixels two-dimensionally arranged in a lattice. By varying the direction of a reflection beam at every pixel or by varying the polarizing direction of a reflection beam at every pixel, it is possible to simultaneously generate an information beam provided with information as a two-dimensional pattern and a spatially modulated reference beam. FIG. 27 shows an example in which a digital mirror device is used as the reflective spatial light modulator 11. An information beam generated by the reflective spatial light modulator 11 is incident on the dichroic prism 16. The dichroic prism 16 is designed to transmit the wavelength of the recording beam. The beam transmitted through the dichroic prism 16 is applied to the optical recording media 1 by the objective lens 7 such that the beam is focused on the outer interface of the transparent substrate 4 of the optical recording media 1 so as to minimize the beam size. On the other hand, a beam reflected by the polarization beam splitter 80 is used as a reference beam. The reference beam is changed by a polarizing optical element 81 so as to have a polarization component that can interfere with the recording beam. The polarizing optical element 81 may be mostly a half wavelength plate. The reference beam transmitted through the polarizing optical element 81 is applied to the same spot of the optical recording layer 3 of the optical recording media 1 with varying the incident angle by a galvano mirror 82 and relay lenses 83 and 84. In this manner, the optical recording media 1 is irradiated with the information beam and the reference beam, so that a hologram is formed inside the optical recording layer 3. The hologram can be recorded in angular multiplexing by varying the incident angle of the reference beam in recording.

To reconstruct recorded information, a recorded hologram is irradiated with a reference beam at the same incident angle as that used in recording. When transmitted through the optical recording media 1, the reference beam is partly diffracted by the recorded hologram to become a reproducing beam that reconstructs an information beam. The reproducing beam is emitted so as to pass through the optical recording media 1. The beam is then transmitted through the pickup lens 75 and enters the beam splitter 18. Most of the reproducing beam is reflected by the beam splitter 18, and then is imaged on a two-dimensional photodetector 20 as a reproduced image. Like the optical recording and reproducing apparatus in FIG. 26, the optical recording and reproducing apparatus in FIG. 27 performs positioning using a servo beam reflected on the outer interface of the transparent substrate. With the transmissive two-beam interference method, the positional relationship between the information beam and the reference beam must be fixed during hologram recording. Accordingly, the servo for driving the objective lens 7, used for the collinear interference method, is not performed. Positioning is carried out by finely moving the optical recording media 1 on the basis of the focus error signal and tracking error signal provided by the four-quadrant photodetector 28 or finely moving all the optical parts except the optical recording media 1 shown in FIG. 27 in a unit.

A method for detecting a wavelength shift from the base wavelength of the recording beam is almost the same as that described for the transmissive collinear interference method. All the pixels in the reflective spatial light modulator 11 are turned on to irradiate the optical recording media 1 with a uniform beam. The segmented photodetector 30 detects a diffraction beam from the wavelength reference marks 40 and provides a wavelength error signal. The two-dimensional photodetector 20 may be used as a substitution of the segmented photodetector so that a wavelength error signal can be similarly obtained using an output therefrom. Further, a wavelength shift from the base wavelength can be detected by irradiating the wavelength reference marks 40 only with the reference beam so that the two-dimensional photodetector 20 can detect the angle of a diffraction beam from the wavelength reference marks 40.

As described above, the embodiments of the present invention provide an apparatus and method for holographic optical recording and reproducing which is resistant to a variation in recording and reproducing wavelength associated with environments or a variation in recording or reproducing wavelength among apparatuses and which is excellent in portability and compatibility among apparatuses.

EXAMPLES

<Preparation of Optical Recording Media>

In the present example, the reflective optical recording media 1 shown in FIG. 1 was prepared.

(Production of Transparent Substrate)

First, a master disk was produced as described below. A disk-shaped glass substrate was spin-coated with an electron-beam resist. An electron-beam drawing apparatus was used to draw a pattern of tracks and a pattern of wavelength reference marks on the electron resist. The tracks constitute concentric circles. The wavelength reference marks are provided in four regions of the disk at intervals of n/4 and extend in a direction orthogonal to the tracks. Each region in which the wavelength reference marks are provided has a length of 50 μm along the track. After the electron-beam drawing, a development step, a nickel sputtering step, and a nickel plating step were performed to obtain a master disk. Then, polycarbonate was injected and molded using the master disk obtained, to provide a transparent substrate 4 shown in FIG. 1, which was used in the present example. Observation with an atomic force microscope indicated that the track pitch was 400 nm and the period of the wavelength reference marks was 800 nm. An aluminum layer with a thickness of 200 nm was deposited by sputtering as the reflection layer 5 in FIG. 1.

(Preparation of Optical Recording Layer Material)

First, 3.86 g of vinyl carbazol and 2.22 g of vinyl pyrrolidone were mixed and 0.1 g of IRGACURE 784 (manufactured by Chiba Specialty Chemicals) was added to the mixture, which was stirred. After all the components were dissolved, 0.04 g of PERBUTYL H (NOF Corporation) was mixed to prepare a monomer solution A. Then, 10.1 g of 1,4-butanediol diglycidyl ether and 3.6 g of diethylene triamine were mixed to prepare an epoxy solution B. Then, 1.5 ml of monomer solution A and 8.5 ml of epoxy solution B were mixed and defoamed to prepare a precursor for the optical recording layer.

(Production of Optical Recording Media)

A spacer of thickness 250 μm consisting of a fluorocarbon resin was placed on a circumferential part of a principal surface of the transparent substrate which was opposite to the reflection layer. The mixed solution of the precursor for the optical recording layer was cast between the spacer and the substrate. After the casting, a separately prepared disk-shaped polycarbonate substrate was placed opposite to the above substrate. A uniform pressure was then exerted on the substrates to extend the mixed solution to a thickness of 250 μm. Finally, the substrates were heated at 50° C. for 10 hours to produce an optical recording media 1 having an optical recording layer with a thickness of 250 μm. The optical recording media 1 produced in the present example used the upper carbonate substrate as the protection layer 2. In the present example, the series of operations were performed in a room in which light of shorter wavelengths than 600 nm was blocked, thus preventing the optical recording layer 3 from being exposed to light.

<Production of Optical Recording and Reproducing Apparatuses>

First, two optical recording and reproducing apparatuses were produced which were configured as shown in FIG. 6. The objective lens had a numerical aperture (NA) of 0.5. The optical recording and reproducing apparatuses are designated as A and B. A gallium nitride-based semiconductor laser element was used as the light source 8, and an external resonator structure shown in FIG. 17 is fabricated (oscillation wavelength thereof was 403 to 405 nm). A linearly polarized semiconductor laser (wavelength: 650 nm) was used as the servo light source 22. A digital mirror device was used as the reflective spatial light modulator 11. A CCD array was used as the two-dimensional photodetector 20. A quarter wavelength plate of wavelength 405 nm was used as the polarizing optical element 15. A quarter wavelength plate of wavelength 650 nm was used as the polarizing optical element 25. The quarter wavelength plate used as the polarizing optical element 15 was adjusted for the orientation so that a reproducing beam had the maximum intensity on the two-dimensional photodetector 20. Similarly, the quarter wavelength plate used as the polarizing optical element 25 was adjusted for the orientation so that the maximum light intensity was achieved on the four-quadrant photodetector 28.

<Test 1>

(Recording of Information)

The optical recording media 1 produced using the above method was mounted in the optical recording and reproducing apparatus A. Then, information was actually recorded on the optical recording media 1. The optical recording media 1 was fixed to the spindle motor. The optical recording media 1 was rotated at a rotation speed of 1 rpm. The laser was illuminated in synchronism with an address signal to record a hologram, while performing servo on the optical recording media and correcting the wavelength on the basis of the wavelength reference marks 40. The light intensity at the surface of the optical recording media 1 was 0.1 mW. The laser beam had a spot size of 400 μm at the top surface of the optical recording layer 3. A region with 400×400=160,000 pixels was used on the digital mirror device 11. A region of 144×144 pixels at the central portion was used as an information beam region. Adjacent 4×4=16 pixels constituted one symbol. Thus, a 16:3 modulation was used which employed 3 of the 16 pixels as bright points.

(Reproduction of Information)

The optical recording media 1 on which information had been recorded as described above was removed from the spindle motor of the optical recording and reproducing apparatus A. The optical recording media 1 was fixed to the spindle motor of the optical recording and reproducing apparatus A again. The optical recording media 1 was rotated at a rotation speed of 1 rpm. The laser was illuminated in synchronism with an address signal to reconstruct a hologram using the two-dimensional photodetector (CCD array) 20, while performing servo on the optical recording media and correcting the wavelength on the basis of the wavelength reference marks 40. In reproducing, only the reference beam region 32 was displayed on the digital mirror device as a reference beam as shown in FIG. 8. The light intensity at the surface of the optical recording media 1 was 0.05 mW.

(Determination for Information)

The recording/reproducing performance in test 1 was evaluated as described below. An aligning mark was used to perform image processing on 1,120 symbols in the information beam area obtained using the two-dimensional photodetector (CCD array) 20. Then, bright and dark points were determined, and an output pattern was recognized and compared with the pattern input to the digital mirror device 11. As a result, none of the 1,120 symbols involved determination errors.

<Test 2>

The optical recording media 1 on which information had been recorded was fixed to the spindle motor of the optical recording and reproducing apparatus A again. The hologram was reconstructed without correcting the wavelength on the basis of the wavelength reference marks.

The recording/reproducing performance in test 2 was evaluated in the same manner as in test 1. As a result, 5 of the 1,120 symbols involved determination errors.

<Test 3>

The optical recording media 1 on which information had been recorded in test 1 was fixed to the spindle motor of the optical recording and reproducing apparatus B instead of the optical recording and reproducing apparatus A used for recording. The optical recording media 1 was rotated at a rotation speed of 1 rpm. The laser was illuminated in synchronism with an address signal to record a hologram using the two-dimensional photodetector (CCD array) 20, while performing servo on the optical recording media and correcting the wavelength on the basis of the wavelength reference marks as in the case of test 1.

The recording/reproducing performance in test 3 was evaluated in the same manner as in test 1. As a result, 1 of the 1,120 symbols involved determination errors.

<Test 4>

The optical recording media 1 on which information had been recorded in test 1 was fixed to the spindle motor of the optical recording and reproducing apparatus A again. The hologram was reconstructed without correcting the wavelength on the basis of the wavelength reference marks.

The recording/reproducing performance in test 4 was evaluated in the same manner as in test 1. As a result, 24 of the 1,120 symbols involved determination errors.

<Test 5>

The same optical recording media as described above and the optical recording and reproducing apparatus A were used. A hologram was recorded in synchronism with an address signal while performing servo on the optical recording media and without correcting the wavelength on the basis of the wavelength reference marks as in test 1, with the other conditions set in the same manner as that for test 1.

The optical recording media 1 on which information had been recorded as described above was removed from the spindle motor of the optical recording and reproducing apparatus A. The optical recording media 1 was fixed to the spindle motor of the optical recording and reproducing apparatus A again. The optical recording media 1 was then rotated at a rotation speed of 1 rpm. The laser was illuminated in synchronism with an address signal to reconstruct the hologram while performing servo on the optical recording media 1 and without correcting the wavelength on the basis of the wavelength reference marks.

The recording/reproducing performance in test 5 was evaluated in the same manner as in test 1. As a result, 8 of the 1,120 symbols involved determination errors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for optical recording in which information is recorded on an optical recording media utilizing holography, the method comprising:

preparing an optical recording media having wavelength reference marks with a periodic structure characteristic based on a recording base wavelength;

irradiating the wavelength reference marks with a beam from a light source on recording information to detect a wavelength shift of the light source with respect to the base wavelength based on a diffraction beam from the wavelength reference marks; and performing holographic recording while controlling the wavelength of the light source so as to reduce the wavelength shift.

2. A method for optical reproducing in which information recorded on an optical recording media utilizing holography is reconstructed, the method comprising:

preparing an optical recording media having wavelength reference marks with a periodic structure characteristic based on a recording base wavelength;

irradiating the wavelength reference marks with a beam from a light source on reproducing information to detect a wavelength shift of the light source with respect to the base wavelength based on a diffraction beam from the wavelength reference marks; and performing holographic reproducing while controlling the wavelength of the light source so as to reduce the wavelength shift.

3. An optical recording media on which information is recorded utilizing holography comprising:

a holographic information recording region; and a region having wavelength reference marks with a periodic structure characteristic based on a recording base wavelength to cause diffraction of a recording beam and a reproducing beam.

4. The optical recording media according to claim 3, comprising:

a transparent substrate;

an optical recording layer formed on one surface of the transparent substrate; and a reflection layer formed on the other surface of the transparent substrate, wherein the periodic structure of the wavelength reference marks has protruded and recessed surfaces formed at an interface between the transparent substrate and the reflection layer.

5. The optical recording media according to claim 3, comprising:

a transparent substrate;

a dichroic reflection layer and an optical recording layer sequentially formed on one surface of the transparent substrate; and a reflection layer formed on the other surface of the transparent substrate, wherein the periodic structure of the wavelength reference marks has protruded and recessed surfaces formed at an interface between the transparent substrate and the dichroic reflection layer.

6. The optical recording media according to claim 3, comprising:

a transparent substrate;

a dichroic reflection layer and an optical recording layer sequentially formed on one surface of the transparent substrate; and a reflection layer formed on the other surface of the transparent substrate, wherein the periodic structure of the wavelength reference marks has protruded and recessed surfaces formed at an interface between the transparent substrate and the reflection layer, and the dichroic reflection layer is eliminated above the wavelength reference marks.

7. The optical recording media according to claim 3, comprising:

a transparent substrate; and an optical recording layer formed on one surface of the transparent substrate, wherein the periodic structure of the wavelength reference marks has protruded and recessed surfaces formed on the other surface of the transparent substrate.

8. The optical recording media according to claim 3, wherein a periodic direction of the periodic structure of the wavelength reference marks is in a track direction.

9. The optical recording media according to claim 3, wherein assuming that a reference wavelength is $\lambda$ and a numerical aperture of an objective lens is NA, a period of the wavelength reference marks is within a range between $2\lambda/3NA$ and $2\lambda/NA$.

10. An optical recording and reproducing apparatus which performs recording information to and reproducing information from an optical recording media utilizing holography, the optical recording media having a holographic information recording region and a region having wavelength reference marks with a periodic structure characteristic based on a recording base wavelength to cause diffraction of a recording beam and a reproducing beam, the apparatus comprising:

a light source;

a spatial light modulator which generates an information beam and/or reference beam from a beam emitted from the light source;

an optical system adapted to irradiate the holographic information recording region of the optical recording media with the information beam and the reference beam that are a recording beam, to irradiate the holographic information recording region of the optical recording media with the reference beam that is a reproducing beam, and to irradiate the region of the optical recording media in which the wavelength reference marks are formed with the recording beam or the reproducing beam;

a photodetector detecting a wavelength shift of the light source with respect to the recording base wavelength based on a diffraction beam of the recording beam or reproducing beam with which the wavelength reference mark region of the optical recording media is irradiated; and a wavelength controller controlling a wavelength of the light source so as to reduce the wavelength shift.

11. The apparatus according to claim 10, wherein the photodetector is divided into a plurality of segments in the same direction as a periodic direction of the wavelength reference marks of the optical recording media.

12. The apparatus according to claim 10, wherein the light source is provided with an external resonator.

13. The apparatus according to claim 10, wherein the light source and the photodetector is arranged on a same side to the optical recording media.

14. The apparatus according to claim 10, wherein the light source and the photodetector is arranged on opposite sides to each other to the optical recording media.

* * * * *